US012739610B2

(12) United States Patent
Sun et al.

(10) Patent No.: US 12,739,610 B2
(45) Date of Patent: Sep. 15, 2026

(54) COMMUNICATION METHOD, APPARATUS, AND CHIP

(71) Applicant: HUAWEI TECHNOLOGIES CO., LTD., Shenzhen (CN)

(72) Inventors: Haiyang Sun, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 687 days.

(21) Appl. No.: 17/978,727

(22) Filed: Nov. 1, 2022

(65) Prior Publication Data

US 2023/0068860 A1 Mar. 2, 2023

Related U.S. Application Data

(63) Continuation of application No. PCT/CN2021/079811, filed on Mar. 9, 2021.

(30) Foreign Application Priority Data

May 7, 2020 (CN) ........................ 202010379338.8

(51) Int. Cl.
*H04W 60/04* (2009.01)
*H04W 8/06* (2009.01)
(Continued)

(52) U.S. Cl.
CPC ............ *H04W 8/06* (2013.01); *H04W 48/14* (2013.01); *H04W 48/18* (2013.01); *H04W 60/04* (2013.01);
(Continued)

(58) Field of Classification Search
CPC ....... H04W 8/06; H04W 48/14; H04W 48/18; H04W 60/04; H04W 72/23; H04W 8/12;
(Continued)

(56) References Cited

U.S. PATENT DOCUMENTS

2019/0174449 A1* 6/2019 Shan .................... H04W 60/04
2020/0137552 A1 4/2020 Park et al.
(Continued)

FOREIGN PATENT DOCUMENTS

CN 110324813 A 10/2019
CN 110603830 A 12/2019
(Continued)

OTHER PUBLICATIONS

Ericsson, Charter Communications, CableLabs, Wireline 5G access network and wireline 5G access clean up. 3GPP TSG-CT WG1 Meeting #122-e, Electronic meeting, Feb. 20-28, 2020, C1-200282, 12 pages.

(Continued)

*Primary Examiner* — Schquita D Goodwin
(74) *Attorney, Agent, or Firm* — Rimon PC

(57) ABSTRACT

Communication methods and apparatus are provided in this disclosure. The method includes that after receiving a registration request sent by a terminal device, an access and mobility management function (AMF) sends first information to a unified data management (UDM) network element. The first information includes network slice selection assistance information (NSSAI) requested by the terminal device, single network slice selection assistance information (S-NSSAI) in a home domain corresponding to the NSSAI requested by the terminal device, or subscribed S-NSSAI of the terminal device. The AMF receives steering of roaming (SoR) information of the terminal device from the UDM. The SoR information includes information about a preferred public land mobile network (PLMN) of the terminal device. The AMF sends the SoR information to the terminal device. Based on these solutions, the UDM may determine each preferred PLMN of the terminal device based on a network slice expected by the terminal device.

18 Claims, 16 Drawing Sheets

(51) Int. Cl.

| | |
|---|---|
| ***H04W 48/14*** | (2009.01) |
| ***H04W 48/18*** | (2009.01) |
| ***H04W 72/23*** | (2023.01) |
| *H04L 41/0894* | (2022.01) |
| *H04L 41/40* | (2022.01) |

(52) U.S. Cl.
CPC ......... *H04W 72/23* (2023.01); *H04L 41/0894* (2022.05); *H04L 41/40* (2022.05)

(58) Field of Classification Search
CPC ..... H04W 48/16; H04W 24/02; H04W 48/20; H04W 60/00; H04L 41/0894; H04L 41/40; H04L 41/0893
See application file for complete search history.

(56) References Cited

U.S. PATENT DOCUMENTS

| | | | | |
|---|---|---|---|---|
| 2020/0221377 | A1* | 7/2020 | Lee | H04W 76/28 |
| 2021/0250890 | A1* | 8/2021 | Won | H04W 60/04 |
| 2021/0297940 | A1* | 9/2021 | Prakasam | H04W 8/205 |
| 2022/0053449 | A1* | 2/2022 | Shan | H04W 36/0066 |
| 2022/0377529 | A1* | 11/2022 | Kim | H04W 8/08 |
| 2023/0107525 | A1* | 4/2023 | Gupta | H04W 8/06 455/435.2 |
| 2023/0143638 | A1* | 5/2023 | Casati | H04W 8/06 455/435.2 |
| 2023/0163905 | A1* | 5/2023 | Liu | H04W 48/18 370/329 |
| 2023/0189187 | A1* | 6/2023 | Velev | H04W 48/16 455/435.1 |
| 2023/0308842 | A1* | 9/2023 | Long | H04L 67/02 |

FOREIGN PATENT DOCUMENTS

| | | | |
|---|---|---|---|
| WO | 2019017689 | A1 | 1/2019 |
| WO | 2019123013 | A1 | 6/2019 |
| WO | 2019197589 | A1 | 10/2019 |
| WO | 2020067112 | A1 | 4/2020 |
| WO | 2021162503 | A1 | 8/2021 |

OTHER PUBLICATIONS

Huawei, HiSilicon, Acquiring user location information for SOR. 3GPP TSG-CT WG1 Meeting #120, Portoroz (Slovenia), Oct. 7-11, 2019, C1-196344, 9 pages.

Nokia, Nokia Shanghai Bell, Samsung, KI: Area of service: impact on PLMN selection in roaming . SA WG2 Meeting #136-AH, Jan. 13-17, 2020, Incheon, Korea, S2-2000871, 2 pages.

3GPP TS 33.501 V16.2.0 (Mar. 2020), 3rd Generation Partnership Project; Technical Specification Group Services and System Aspects; Security architecture and procedures for 5G system (Release 16); (2020); 227 pages.

* cited by examiner

COMMUNICATION METHOD, APPARATUS, AND CHIP

CROSS-REFERENCE TO RELATED APPLICATIONS

This application is a continuation of International Application No. PCT/CN2021/079811, filed on Mar. 9, 2021, which claims priority to Chinese Patent Application No. 202010379338.8, filed on May 7, 2020. The disclosures of the aforementioned applications are hereby incorporated by reference in their entireties.

TECHNICAL FIELD

Embodiments of this application generally relates to the field of communication technologies, and in particular, to a communication method, an apparatus, and a chip.

BACKGROUND

A network slice is an end-to-end logical network that is virtualized on a hardware infrastructure. The network slice is virtualized on the hardware infrastructure by using a network slicing technology, and is a key technology utilized to meet differentiated network requirements of a 5th generation (5G) mobile communication technology. By using the network slicing technology, an operator may virtualize a plurality of network slices on a hardware infrastructure, so that each network slice may meet different requirements of various services through on-demand resource allocation and a flexible combination capability. When a requirement is raised by the various services, but a current network cannot meet the requirement, the operator may virtualize a new slice network for the requirement without affecting existing slice networks. In this way, a service can be rolled out as soon as possible.

In a visited (that is, in a roaming scenario) registration procedure of a terminal device, a unified data management (UDM) network element corresponding to the terminal device may respond to a subscription information request of a visited access and mobility management function (AMF) network element, and send steering of roaming (SoR) information to the visited AMF network element. The terminal device selects a public land mobile network (PLMN) based on the SoR information that is fed back by the visited AMF network element. However, priorities of PLMNs included in the SoR information are sorted based on a preset policy, and there may be a problem that the PLMN selected by the terminal device does not support a network slice to be used by the terminal device. Consequently, the terminal device performs PLMN selection for a plurality of times to attempt to access a selected PLMN, and access efficiency is negatively affected.

SUMMARY

Embodiments of this application provide a communication method, an apparatus, and a chip, used to avoid a problem that a public land mobile network (PLMN) selected by a terminal device does not support a network slice to be used by the terminal device. Consequently in conventional systems and methods, the terminal device performs PLMN selection for a plurality of times to attempt to access a selected PLMN, and access efficiency is negatively affected. In this method, the PLMN selected by the terminal device can support the network slice to be used by the terminal device, and the terminal device is prevented from performing PLMN selection for a plurality of times to attempt to access the selected PLMN, so that access efficiency is improved.

According to a first aspect, this application provides a communication method. The method includes: after receiving a registration request sent by a terminal device, an access and mobility management function (AMF) network element sends first information to a unified data management (UDM) network element. The first information includes network slice selection assistance information (NSSAI) requested by the terminal device, single network slice selection assistance information (S-NSSAI) in a home domain corresponding to the NSSAI requested by the terminal device, or subscribed S-NSSAI of the terminal device. The AMF network element receives steering of roaming (SoR) information of the terminal device from the UDM network element, where the SoR information includes information about one or more preferred public land mobile network (PLMN) of the terminal device. The AMF network element sends the SoR information to the terminal device.

By applying the foregoing method, when determining the SoR information of the terminal device, the UDM network element may determine the one or more preferred PLMN of the terminal device based on a network slice expected (e.g., requested) by the terminal device, to ensure that the terminal device selects a PLMN that supports the network slice that the terminal device expects to use. This can avoid a problem that the terminal device performs PLMN selection for a plurality of times to attempt to access a selected PLMN and access efficiency is low, so that the access efficiency is improved.

In a possible design, the method further includes, that when the NSSAI requested by the terminal device changes, the AMF network element sends a change notification of the NSSAI requested by the terminal device to the UDM network element.

In the foregoing design, when the NSSAI requested by the terminal device changes, the AMF network element sends, to the UDM network element, the change notification of the NSSAI requested by the terminal device, so that the UDM network element updates the NSSAI requested by the terminal device. This can ensure that the one or more preferred PLMN of the terminal device to be determined by the UDM network element supports a network slice expected (e.g., requested) by the terminal device, and can further avoid a problem that the terminal device performs PLMN selection for a plurality of times to attempt to access a selected PLMN, causing low access efficiency.

In a possible design, the AMF network element is a visited AMF network element of the terminal device.

In the foregoing design, in a roaming scenario, the AMF network element may be a visited AMF network element of the terminal device, to ensure that the terminal device efficiently selects a PLMN in the roaming scenario.

According to a second aspect, this application provides a communication method. The method includes an access and mobility management function (AMF) network element that determines information about one or more public land mobile network (PLMN) supported by a terminal device and information about a network slice supported by the one or more PLMN. The method further includes that the AMF network element sends the information about one or more PLMN supported by the terminal device and the information about the network slice supported by the one or more PLMN to the terminal device.

By applying the foregoing method, the AMF network element sends, to the terminal device, the information about the one or more PLMN supported by the terminal device and the information about the network slice supported by the one or more PLMN. When accessing a PLMN, the terminal device may select, based on a network slice expected by the terminal device and in the one or more PLMN supported by the terminal device, a PLMN that supports the network slice expected by the terminal device to access. This can avoid a problem that a PLMN selected by the terminal device does not support the network slice expected by the terminal device to access, and consequently the terminal device performs PLMN selection for a plurality of times to attempt to access a selected PLMN, and causes access efficiency to be low. Therefore, the access efficiency is improved.

In a possible design, that the AMF network element determines information about the one or more PLMN supported by the terminal device and information about the network slice supported by the one or more PLMN includes that the AMF network element obtains, from a unified data management (UDM) network element, the information about the one or more PLMN supported by the terminal device. The AMF network element obtains, from a network slice selection function (NSSF) network element based on the information about the one or more PLMN supported by the terminal device, the information about the network slice supported by the one or more PLMN supported by the terminal device.

In a possible design, that the AMF network element determines information about the one or more PLMN supported by the terminal device and information about the network slice supported by the one or more PLMN includes that the AMF network element obtains, from an NSSF network element, information about a network slice supported by one or more PLMNs. The method further includes that the AMF network element obtains, from a UDM network element, the information about the one or more PLMN supported by the terminal device, where the one or more PLMNs support roaming. The AMF network element determines, based on the information about the network slice supported by the one or more PLMNs, the information about the network slice supported by the one or more PLMN supported by the terminal device.

In a possible design, that the AMF network element determines information about the one or more PLMN supported by the terminal device and information about the network slice supported by the one or more PLMN includes that the AMF network element receives steering of roaming (SoR) information of the terminal device from a UDM network element, where the SoR information includes the information about the one or more PLMN supported by the terminal device and the information about the network slice supported by the one or more PLMN.

In the foregoing design, a plurality of manners in which the AMF network element determines the information about the one or more PLMN supported by the terminal device and the information about the network slice supported by the one or more PLMN are provided, so that implementation requirements of the AMF network element for determining the information about the one or more PLMN supported by the terminal device and the information about the network slice supported by the one or more PLMN in different scenarios may be met.

In a possible design, that the AMF network element sends the information about the one or more PLMN supported by the terminal device and the information about the network slice supported by the one or more PLMN to the terminal device includes that the AMF network element sends the SoR information to the terminal device, where the SoR information includes the information about the one or more PLMN supported by the terminal device and the information about the network slice supported by the one or more PLMN.

In the foregoing design, in a roaming scenario of the terminal device, the AMF network element may send, to the terminal device based on the SoR information, the information about the one or more PLMN supported by the terminal device and the information about the network slice supported by the one or more PLMN, to ensure that the terminal device accurately selects a PLMN that supports a network slice that the terminal device expects to access.

In a possible design, the one or more PLMN supported by the terminal device is a PLMN supported by the terminal device in a registration domain.

In a possible design, the one or more PLMN that is determined and that is supported by the terminal device is a PLMN supported by the terminal device in a registration domain. This can effectively reduce signaling overheads without affecting an access effect of the terminal device.

In a possible design, the AMF network element is a visited AMF network element of the terminal device.

According to a third aspect, this application provides a communication method. The method includes a unified data management (UDM) network element that determines, based on first information, the one or more public land mobile network (PLMN) that is supported by a terminal device, where the first information includes network slice selection assistance information (NSSAI) requested by the terminal device, single network slice selection assistance information (S-NSSAI) in a home domain corresponding to the NSSAI requested by the terminal device, or subscribed S-NSSAI of the terminal device. The method further includes that the UDM network element sends steering of roaming (SoR) information of the terminal device to an access and mobility management function (AMF) network element, where the SoR information includes information about one or more preferred public land mobile network (PLMN) of the terminal device.

In a possible design, the method further includes that the UDM network element receives the first information from the AMF network element.

In a possible design, the method further includes that the UDM network element receives, from the AMF network element, a change notification of the NSSAI requested by the terminal device. The method may further include that the UDM network element updates the NSSAI requested by the terminal device.

In a possible design, the AMF network element is a visited AMF network element of the terminal device.

For technical effects that can be achieved in the third aspect, refer to the technical effects that can be achieved in the first aspect. Details are not described herein again.

According to a fourth aspect, this application provides a communication method. The method includes a unified data management (UDM) network element that determines information about the one or more PLMN supported by a terminal device and information about a network slice supported by the one or more PLMN. The UDM network element sends steering of roaming (SoR) information of the terminal device to an access and mobility management function (AMF) network element, where the SoR information includes the information about the one or more PLMN supported by the terminal device and the information about the network slice supported by the one or more PLMN.

In a possible design, the one or more PLMN supported by the terminal device is a PLMN supported by the terminal device in a registration domain.

In a possible design, the AMF network element is a visited AMF network element of the terminal device.

For technical effects that can be achieved in the fourth aspect, refer to the technical effects that can be achieved in the second aspect. Details are not described herein again.

According to a fifth aspect, embodiments of this application provide a communication apparatus. The apparatus has functions of implementing the method in the first aspect or any one of the possible designs of the first aspect, or functions of implementing the method in the second aspect or any one of the possible designs of the second aspect. The functions may be implemented by hardware, or may be implemented by executing corresponding software by the hardware. The hardware or the software includes one or more units (e.g., modules, circuits) corresponding to the functions, for example, a transceiver unit (e.g., a transceiver module, a transceiver circuit) and a processing unit (e.g., a processing module, a processing circuit).

In a possible design, the apparatus may be a chip or an integrated circuit.

In a possible design, the apparatus includes a processor and a transceiver, where the processor is coupled with the transceiver, and is configured to implement the functions of implementing the method in the first aspect or any one of the possible designs of the first aspect, or implement the functions of implementing the method in the second aspect or any one of the possible designs of the second aspect. The apparatus may further include a memory. The memory stores a program that may be executed by the processor and that is used to implement the functions of implementing the method in the first aspect or any one of the possible designs of the first aspect, or implement the functions of implementing the method in the second aspect or any one of the possible designs of the second aspect.

In a possible design, the apparatus may be an AMF network element.

According to a sixth aspect, embodiments of this application provide a communication apparatus. The apparatus has functions of implementing the method in the third aspect or any one of the possible designs of the third aspect, or functions of implementing the method in the fourth aspect or any one of the possible designs of the fourth aspect. The functions may be implemented by hardware, or may be implemented by executing corresponding software by the hardware. The hardware or the software includes one or more units (e.g., modules, circuits) corresponding to the functions, for example, a transceiver unit (e.g., a transceiver module, a transceiver circuit) and a processing unit (e.g., a processing module, a processing circuit).

In a possible design, the apparatus may be a chip or an integrated circuit.

In a possible design, the apparatus includes a processor and a transceiver, where the processor is coupled with the transceiver, and is configured to implement the functions of implementing the method in the third aspect or any one of the possible designs of the third aspect, or implement the functions of implementing the method in the fourth aspect or any one of the possible designs of the fourth aspect. The apparatus may further include a memory. The memory stores a program that may be executed by the processor and that is used to implement the functions of implementing the method in the third aspect or any one of the possible designs of the third aspect, or implement the functions of implementing the method in the fourth aspect or any one of the possible designs of the fourth aspect.

In a possible design, the apparatus may be a UDM network element.

According to a seventh aspect, embodiments of this application provide a communication system. The communication system may include an AMF network element and a UDM network element. The AMF network element may perform the method in the first aspect or any one of the possible designs of the first aspect, and the UDM network element may perform the method in the third aspect or any one of the possible designs of the third aspect. Alternatively, the AMF network element may perform the method in the second aspect or any one of the possible designs of the second aspect, and the UDM network element may perform the method in the fourth aspect or any one of the possible designs of the fourth aspect.

According to an eighth aspect, embodiments of this application provide a computer-readable storage medium. The computer-readable storage medium has a computer program or instructions used to implement the method in the first aspect or any one of the possible designs of the first aspect, the method in the second aspect or any one of the possible designs of the second aspect, the method in the third aspect or any one of the possible designs of the third aspect, or the method in the fourth aspect or any one of the possible designs of the fourth aspect.

According to a ninth aspect, embodiments of this application further provide a computer program product, including a computer program or instructions. When the computer program or the instructions are executed, the method in the first aspect or any one of the possible designs of the first aspect may be implemented, the method in the second aspect or any one of the possible designs of the second aspect may be implemented, the method in the third aspect or any one of the possible designs of the third aspect may be implemented, or the method in the fourth aspect or any one of the possible designs of the fourth aspect may be implemented.

According to a tenth aspect, embodiments of this application further provide a chip. The chip is configured to implement the method in the first aspect or any one of the possible designs of the first aspect, implement the method in the second aspect or any one of the possible designs of the second aspect, implement the method in the third aspect or any one of the possible designs of the third aspect, or implement the method in the fourth aspect or any one of the possible designs of the fourth aspect.

For technical effects that can be achieved in the fifth aspect to the tenth aspect, refer to the technical effects that can be achieved in the first aspect and the second aspect. Details are not described herein again.

DESCRIPTION OF EMBODIMENTS

The technical solutions provided in embodiments of this application may be generally applied to a system, such as a fifth generation wireless communication (5G) system, that may be used in an architecture based on a service-based interface, or may be used in an architecture based on a reference point. Further, the technical solutions may be applied to a roaming scenario and a non-roaming scenario. The following disclosure separately describes these several scenarios. An example of these scenarios are described in which a terminal device is user equipment (UE) that is used in the following scenario descriptions.

Figures 1, 2:
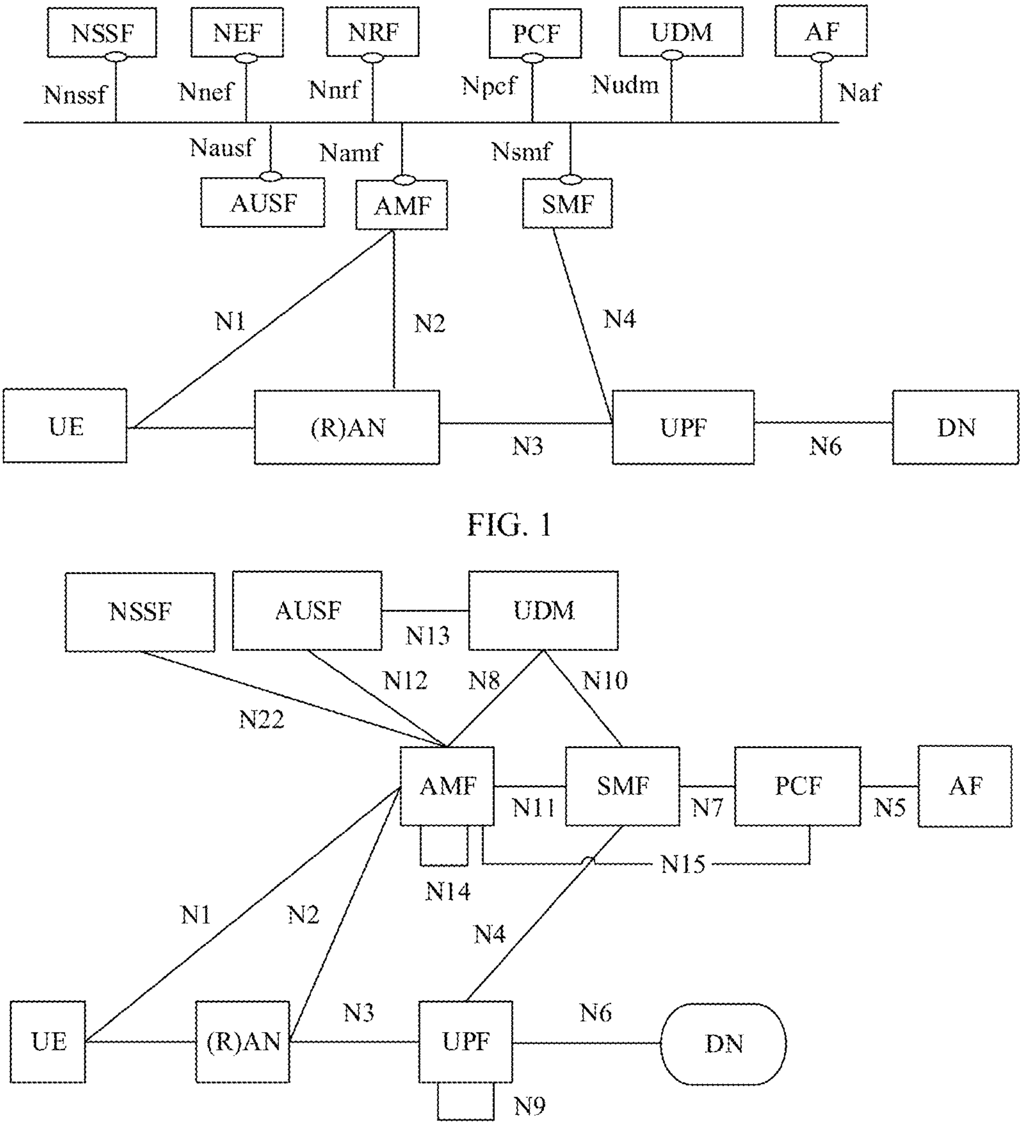
FIG. 1 is a schematic diagram of a first application scenario according to an embodiment of this application.
FIG. 2 is a schematic diagram of a second application scenario according to an embodiment of this application.

FIG. 1 is a diagram of an architecture of a non-roaming scenario based on a service-based interface in a 5G system. In FIG. 1, a network slice selection function (NSSF) network element, a network exposure function (NEF) network element, a network function (NF) repository function (NRF) network element, a policy control function (PCF) network element, a unified data management (UDM) network element, an application function (AF) network element, an authentication server function (AUSF) network element, an access and mobility management function (AMF) network element, and a session management function (SMF) network element are all connected to a same connection line. The NSSF network element is connected to the connection line via an Nnssf interface, the NEF network element is connected to the connection line via an Nnef interface, the NRF network element is connected to the connection line via an Nnrf interface, the PCF network element is connected to the connection line via an Npcf interface, the UDM network element is connected to the connection line via an Nudm interface, the AF network element is connected to the connection line via an Naf interface, the AUSF network element is connected to the connection line via an Nausf interface, the AMF network element is connected to the connection line via an Namf interface, and the SMF network element is connected to the connection line via an Nsmf interface. In addition, the AMF network element further communicates with a (radio) access network ((radio) access network, (R)AN) via an N2 interface, and communicates with user equipment (UE) via an N1 interface. The UE can communicate with the (R)AN. The (R)AN communicates with a user plane function (UPF) network element via an N3 interface. The UPF network element is connected to the SMF network element via an N4 interface, and is connected to a data network (DN) via an N6 interface.

FIG. 2 is a diagram of an architecture of a non-roaming scenario based on a reference point in a 5G system. In FIG. 2, UE may communicate with an AMF network element via an (R)AN, where the (R)AN communicates with the AMF network element via an N2 interface. In addition, the UE may also directly communicate with the AMF network element via an N1 interface. In addition, the (R)AN further communicates with a UPF network element via an N3 interface. The UPF network element communicates with another UPF network element via an N9 interface. The UPF network element further communicates with a data network (DN) via an N6 interface, and communicates with an SMF network element via an N4 interface. The AMF network element communicates with another AMF network element via an N14 interface. The AMF network element further communicates with the SMF network element via an N11 interface, communicates with an AUSF network element via an N12 interface, communicates with a UDM network element via an N8 interface, communicates with a PCF network element via an N15 interface, and communicates with an NSSF network element via an N22 interface. The SMF network element communicates with the UDM network element via an N10 interface, and communicates with the PCF network element via an N7 interface. The PCF network element communicates with an AF network element via an N5 interface.

Figure 3:
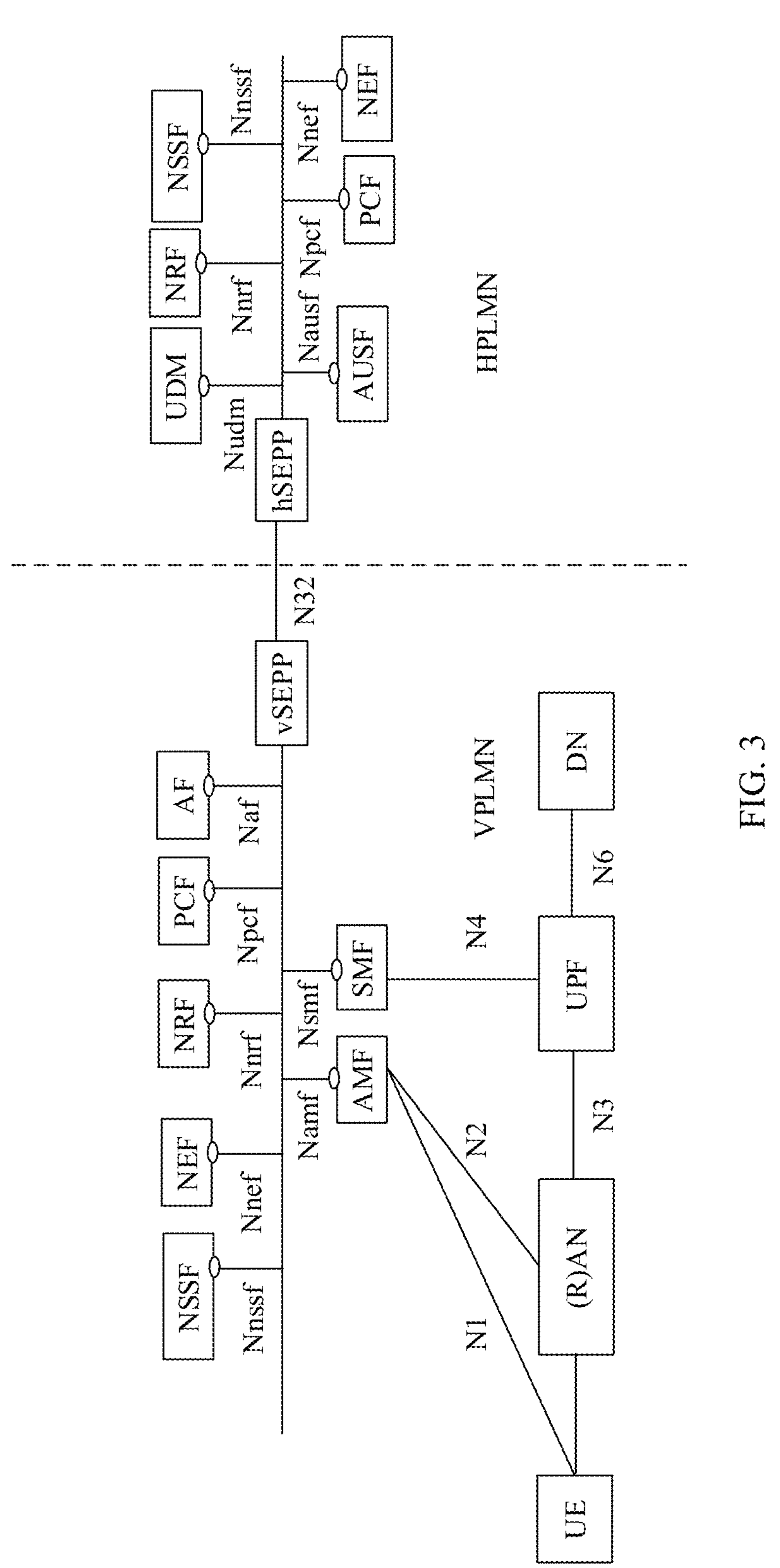
FIG. 3 is a schematic diagram of a third application scenario according to an embodiment of this application.

FIG. 3 is a diagram of an architecture of a first roaming scenario based on a service-based interface in a 5G system. FIG. 3 is a local breakout (LBO) scenario, namely, a scenario in which a data packet of a service needs to be transmitted only in a visiting public land mobile network (VPLMN). In FIG. 3, the VPLMN indicates a network in which UE is located after roaming, and a home public land mobile network (HPLMN) indicates a network in which the UE is located before roaming. That is, the UE roams from the HPLMN to the VPLMN. In the VPLMN, an NSSF network element, an NEF network element, an NRF network element, a PCF network element, an AF network element, an AMF network element, and an SMF network element are all connected to a same connection line. The NSSF network element is connected to the connection line via an Nnssf interface, the NEF network element is connected to the connection line via an Nnef interface, the NRF network element is connected to the connection line via an Nnrf interface, the PCF network element is connected to the connection line via an Npcf interface, the AF network element is connected to the connection line via an Naf interface, the AMF network element is connected to the connection line via an Namf interface, and the SMF network element is connected to the connection line via an Nsmf interface. The connection line is further connected to a visited security edge protection proxy (vSEPP) network element. In addition, the AMF network element further communicates with a (radio) access network ((radio) access network, (R)AN) via an N2 interface, and communicates with UE via an N1 interface. The UE can communicate with the (R)AN. The (R)AN communicates with a UPF network element via an N3 interface. The UPF network element is connected to the SMF network element via an N4 interface, and is connected to a DN via an N6 interface. In the HPLMN, a UDM network element, an NRF network element, an NSSF network element, an AUSF network element, a PCF network element, and an NEF network element are all connected to a same connection line. The UDM network element is connected to the connection line via an Nudm interface, the NSSF network element is connected to the connection line via an Nnssf interface, the NEF network element is connected to the connection line via an Nnef interface, the NRF network element is connected to the connection line via an Nnrf interface, and the PCF network element is connected to the connection line via an Npcf interface. The connection line is further connected to a home security edge protection proxy (hSEPP) network element. A vSEPP network element is connected to the (hSEPP network element via an N32 interface.

Figure 4:
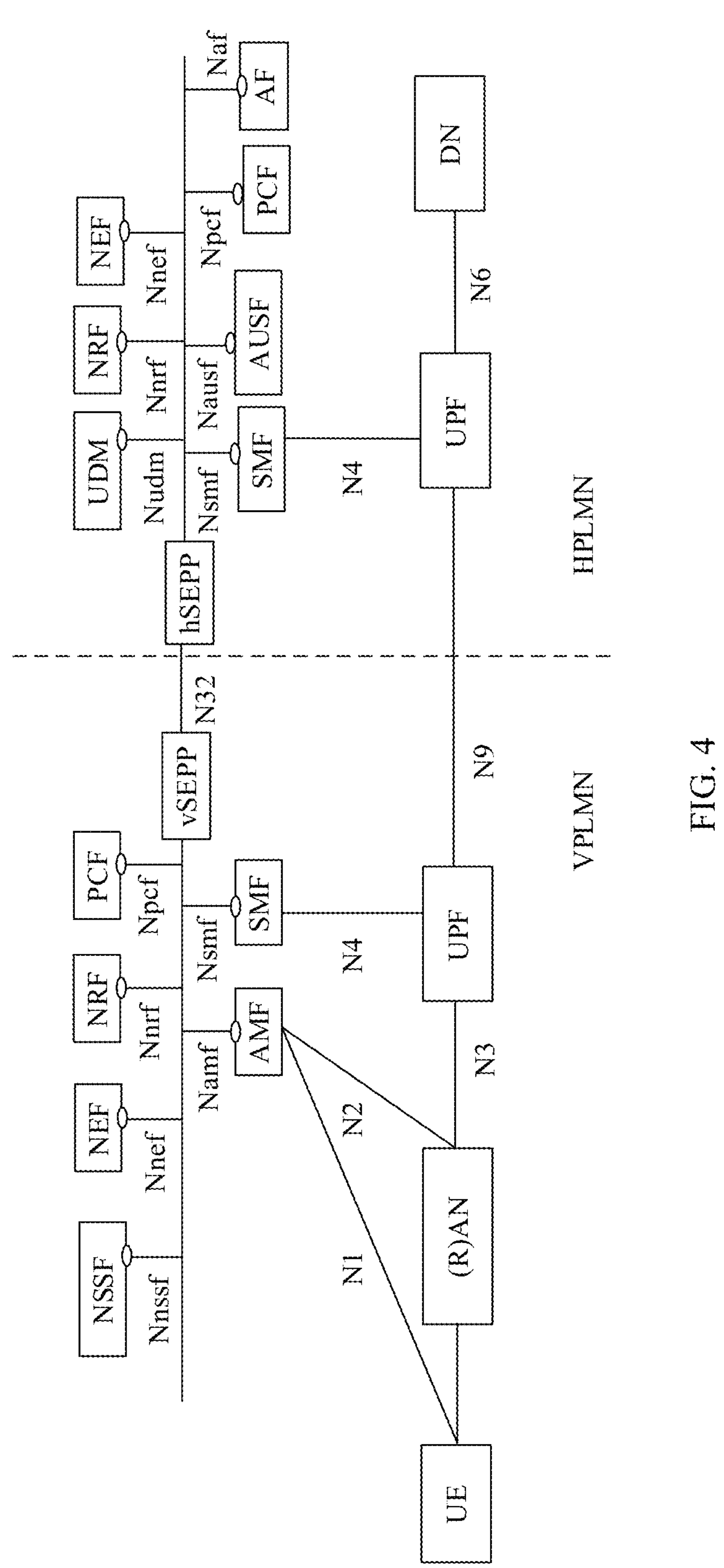
FIG. 4 is a schematic diagram of a fourth application scenario according to an embodiment of this application.

FIG. 4 is a diagram of an architecture of a second roaming scenario based on a service-based interface in a 5G system. FIG. 4 is a home routed (HR) scenario, namely, a scenario in which a data packet of a service needs to be transmitted back to an HPLMN. In FIG. 4, a VPLMN indicates a network in which UE is located after roaming, and the HPLMN indicates a network in which the UE is located before roaming. In the VPLMN, an NSSF network element, an NEF network element, an NRF network element, a PCF network element, an AMF network element, and an SMF network element are all connected to a same connection line. The NSSF network element is connected to the connection line via an Nnssf interface, the NEF network element is connected to the connection line via an Nnef interface, the NRF network element is connected to the connection line via an Nnrf interface, the PCF network element is connected to the connection line via an Npcf interface, the AMF network element is connected to the connection line via an Namf interface, and the SMF network element is connected to the connection line via an Nsmf interface. The connection line is further connected to a vSEPP network element. In addition, the AMF network element further communicates with a (R)AN via an N2 interface, and communicates with UE via an N1 interface. The UE can communicate with the (R)AN. The (R)AN communicates with a UPF network element via an N3 interface. The UPF network element is connected to the SMF network element via an N4 interface, and is connected to a UPF network element of the HPLMN via an N9 interface. In the HPLMN, a UDM network element, an NRF network element, an AUSF network element, an SMF network element, an AF network element, a PCF network element, and an NEF network element are all connected to a same connection line. The UDM network element is connected to the connection line via an Nudm interface, the NSSF network element is connected to the connection line via an Nnssf interface, the NEF network element is connected to the connection line via an Nnef interface, the NRF network element is connected to the connection line via an Nnrf interface, the PCF network element is connected to the connection line via an Npcf interface, the AF network element is connected to the connection line via an Naf interface, and the SMF network element is connected to the connection line via an Nsmf interface. The connection line is further connected to an hSEPP network element. In addition, a vSEPP network element is connected to the hSEPP network element via an N32 interface. The UPF network element is connected to the SMF network element via an N4 interface, and is connected to a DN via an N6 interface.

Figure 5:
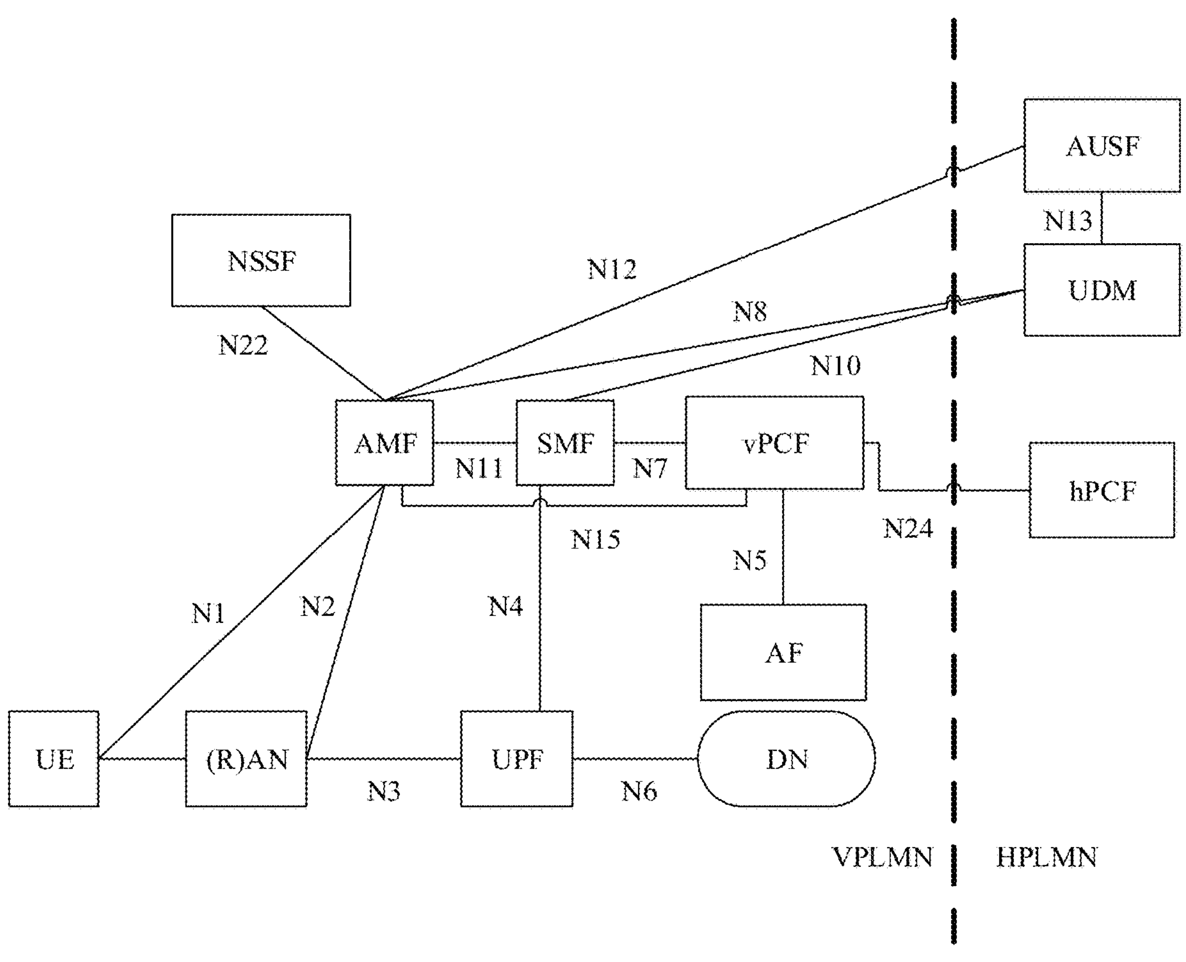
FIG. 5 is a schematic diagram of a fifth application scenario according to an embodiment of this application.

FIG. 5 is a diagram of an architecture of a first roaming scenario based on a reference point in a 5G system. FIG. 5 is also an LBO scenario, namely, a scenario in which a data packet of a service needs to be transmitted only in a VPLMN. In FIG. 5, the VPLMN indicates a network in which UE is located after roaming, and an HPLMN indicates a network in which the UE is located before roaming. In FIG. 5, an NSSF network element of the VPLMN communicates with an AMF network element via an N22 interface. The AMF network element communicates with the UE via an N1 interface, communicates with a (R)AN via an N2 interface, communicates with an SMF network element via an N11 interface, communicates with a vPCF network element via an N15 interface, communicates with an AUSF network element of the HPLMN via an N12 interface, and communicates with a UDM network element of the HPLMN via an N8 interface. The SMF network element communicates with a UPF network element via an N4 interface, communicates with a vPCF network element via an N7 interface, and communicates with the UDM network element of the HPLMN via an N10 interface. The vPCF network element communicates with an AF network element via an N5 interface, and communicates with an hPCF network element of the HPLMN via an N24 interface. The UE can communicate with the (R)AN. The (R)AN communicates with the UPF network element via an N3 interface. The UPF network element communicates with a DN via an N6 interface.

Figure 6:
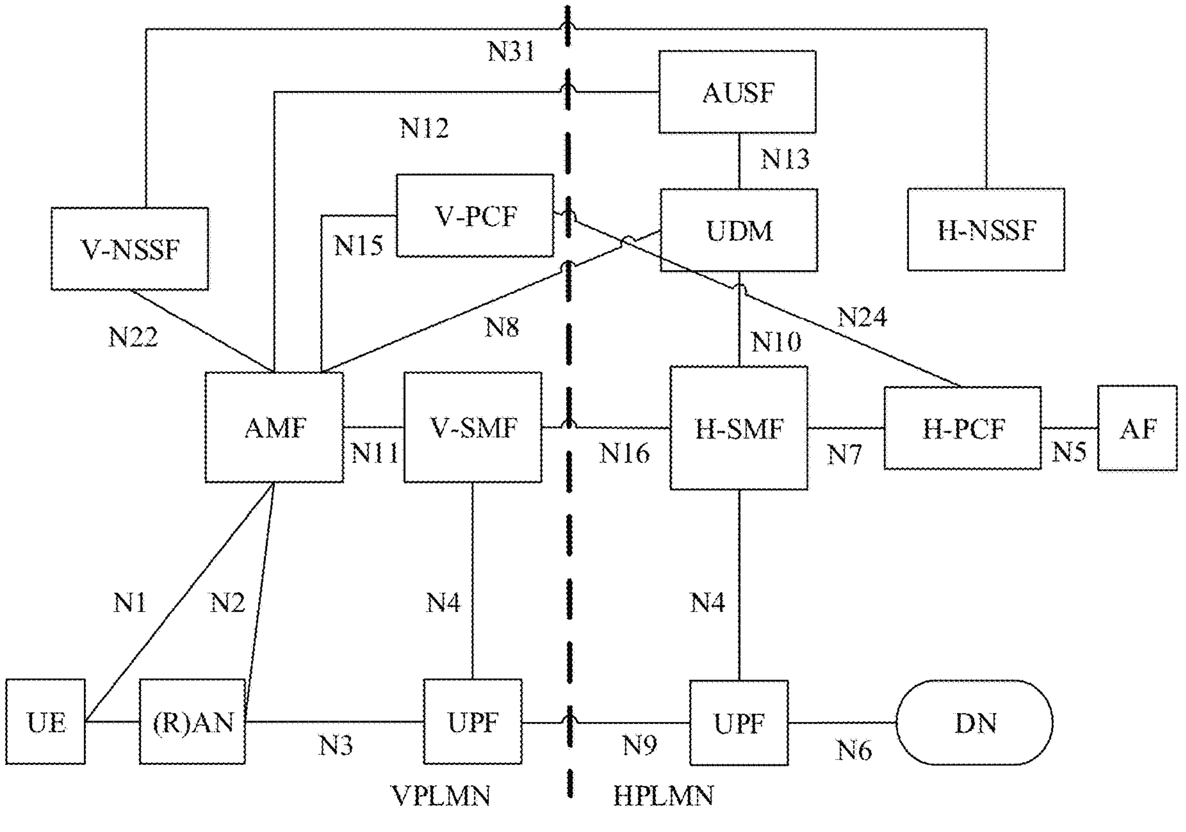
FIG. 6 is a schematic diagram of a sixth application scenario according to an embodiment of this application.

FIG. 6 is a diagram of an architecture of a second roaming scenario based on a reference point in a 5G system. FIG. 6 is a HR scenario, namely, a scenario in which a data packet of a service needs to be transmitted back to an HPLMN. In FIG. 6, a VPLMN indicates a network in which UE is located after roaming, and the HPLMN indicates a network in which the UE is located before roaming. In FIG. 6, a V-NSSF network element of the VPLMN communicates with an AMF network element via an N22 interface, and communicates with an H-NSSF network element of the HPLMN via an N31 interface. The AMF network element communicates with UE via an N1 interface, communicates with a (R)AN via an N2 interface, communicates with an AUSF network element of a HPLMN via an N12 interface, communicates with a V-PCF network element via an N15 interface, communicates with a V-SMF network element via an N11 interface, and communicates with a UDM network element of the HPLMN via an N8 interface. The V-SMF network element communicates with a UPF network element of the VPLMN via an N4 interface, and communicates with an H-SMF network element of the HPLMN via an N16 interface. The H-SMF network element communicates with a UPF network element of the HPLMN via an N4 interface, communicates with an H-PCF network element via an N7 interface, and communicates with the UDM network element via an N10 interface. The UDM network element communicates with the AUSF network element via an N13 interface. The H-PCF network element communicates with the V-PCF network element via an N24 interface, and communicates with an AF network element via an N5 interface. The UE can communicate with the (R)AN. The (R)AN communicates with the UPF network element of the VPLMN via an N3 interface. The UPF network element of the VPLMN communicates with the UPF network element of the HPLMN via an N9 interface. The UPF network element of the HPLMN further communicates with a DN via an N6 interface.

Adding "V" or "v" before a network element has a same meaning, which indicates that the network element belongs to the VPLMN. For example, a V-PCF network element or a vPCF network element indicates a PCF network element in the VPLMN. Adding "H" or "h" before a network element also has a same meaning, which indicates that the network element belongs to the HPLMN. For example, an H-PCF network element or an hPCF network element indicates a PCF network element in the HPLMN, "V" or "H" is only a description of a network or a location where a network element is located, and does not represent a limitation on a function. For example, a V-PCF network element and an H-PCF network element may have a same function or different functions.

Any one of the scenarios shown in FIG. 1 to FIG. 6 may be used as an application scenario of embodiments of this application. Certainly, the foregoing several scenarios are merely examples. Embodiments of this application are not limited to the foregoing application scenarios.

The following briefly describes functions of some network elements or devices.

A terminal device is a device having a wireless transceiver function. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, UE, or the like.

The terminal device may establish a connection to a carrier network through an interface (for example, N1) provided by the carrier network, and use services such as a data service and/or a voice service provided by the carrier network. The terminal device may further access a DN through the carrier network, and use a carrier service deployed on the DN and/or a service provided by a third party. The third party may be a service provider other than the carrier network and the terminal device, and may provide services such as a data service and/or a voice service for the terminal device. A representation form of the third party may be determined based on an actual application scenario, and is not limited herein.

A (R)AN is a subnetwork of a carrier network, and is an implementation system between a service node in the carrier network and a terminal device. To access the carrier network, the terminal device first passes through the RAN, and may be connected to the service node in the carrier network through the RAN. A RAN device is a device that provides a wireless communication function for the terminal device, and the RAN device is also referred to as an access network device. The RAN device includes but is not limited to: a next generation NodeB (gNodeB, gNB), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like in 5G.

Main functions of a UPF network element include user plane related functions such as data packet routing and transmission, packet detection, service usage report, quality of service (QoS) processing, lawful interception, uplink packet detection, and downlink data packet storage.

Main functions of an AMF network element include access and mobility related functions such as connection management, mobility management, registration management, access authentication and authorization, reachability management, and security context management.

Main functions of an SMF network element include session related functions such as session management (for example, session establishment, modification, and release, including tunnel maintenance between a UPF network element and an AN), UPF network element selection and control, service and session continuity (SSC) mode selection, and roaming.

Main functions of a PCF network element include policy related functions such as formulating a unified policy, providing policy control, and obtaining subscription information related to policy decision from a unified data repository (UDR) network element.

Main functions of an NSSF network element include: selecting a group of network slice instances for a terminal device, determining allowed NSSAI, determining an AMF network element set that may serve the terminal device, and the like.

Main functions of an NRF network element include: a service discovery function, maintaining an NF text of an available network function (NF) instance and a supported service of the available network function, and the like.

A main function of an AF network element includes interacting with a 3GPP core network to provide a service, including interaction with an NEF network element, policy architecture interaction, and the like.

Main functions of an NEF network element include: securely exposing a service and a capability provided by a 3GPP network function, including internally exposing the service and the capability, exposing the service and the capability to a third party, or the like; and converting or translating information exchanged with an AF network element and information exchanged with an internal network function, such as an AF service identifier and internal 5G core network information such as a DNN or S-NSSAI.

Main functions of a UDM network element include: supporting authentication credential processing, user identity processing, access authorization, registration and mobility management, subscription management, short message management, and the like in a 3GPP authentication and key agreement mechanism.

Main functions of an AUSF network element include: interacting with a UDM network element to obtain user information, and performing an authentication related function, for example, generating an intermediate key.

A DN is a network outside a carrier network. A carrier network may access a plurality of DNs. A plurality of services may be deployed in one DN, and a DN may provide services such as a data service and/or a voice service for a terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be implemented by a plurality of devices, or may be one functional module in one device. This is not specifically limited in embodiments of this application.

Figures 7, 8A:
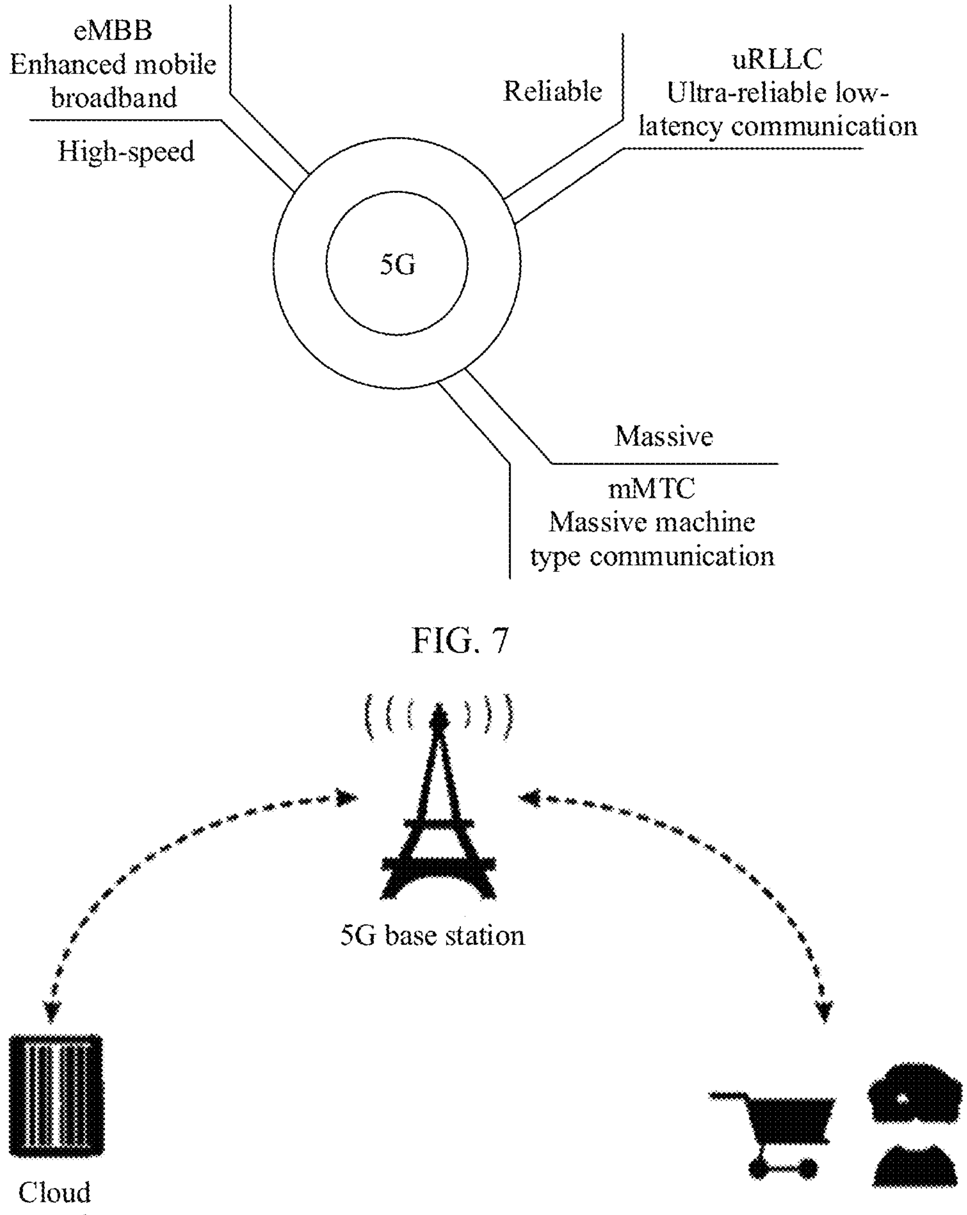
FIG. 7 is a schematic diagram of three major application scenarios of fifth-generation communication (5G) according to an embodiment of this application.
FIG. 8A and FIG. 8B are schematic diagrams of application of enhanced mobile broadband (eMBB) and massive machine-type communications (mMTC) according to embodiments of this application.
Figure 8B:
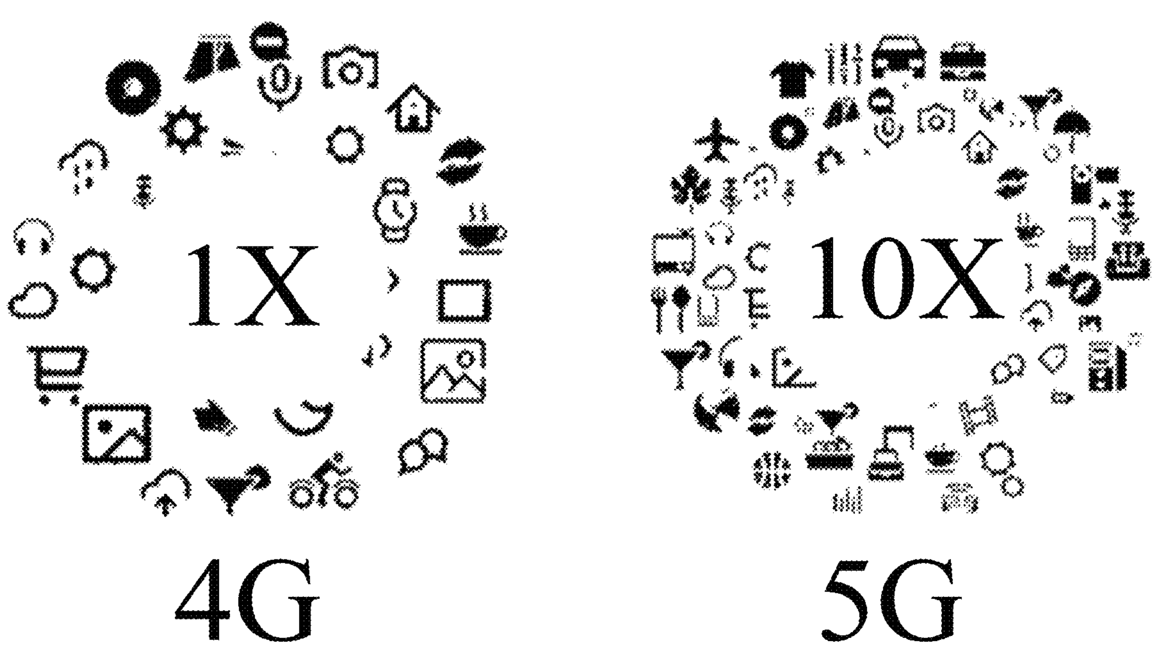

5G will usher in an era of Internet of Everything. As shown in FIG. 7, 5G supports three major scenarios: enhanced mobile broadband (eMBB), massive machine type communication (mMTC), and ultra-reliable low-latency communication (uRLLC). eMBB: Based on technological breakthroughs in spectrum utilization and spectrum bandwidth on the radio side, 5G may provide a transmission rate over 10 times faster than that 4G. As shown in FIG. 8A, a requirement of currently popular AR/VR and high-definition video live broadcast can only be met via a 5G ultra-high rate, and may not be met via a 4G transmission rate. When VR is used to watch an HD video or play a large interactive game, a network cable is required to obtain data. In the future, the VR/AR can provide fast experience over wireless connection through a 5G network. mMTC: By using technologies such as multi-user shared access and an ultra-dense heterogeneous network, as shown in FIG. 8B, 5G can support access of 1 million devices per square kilometer, which is 10 times more than the quantity of devices per square kilometer supported in 4G. With rapid development of smart cities, public facilities such as street lamps, manhole covers, and water meters have network connection capabilities and can be remotely managed. However, 5G will be more innovative. With a powerful connection capability of the 5G network, public devices in various industries in a city can be connected to an intelligent management platform. These public facilities collaborate with each other through the 5G network and can be managed by a small quantity of maintenance personnel, so that the operation efficiency of the city is greatly improved. uRLLC: The most typical application in a 5G scenario is autonomous driving. In the most common scenarios such as emergency braking, vehicle-to-vehicle (V2V), vehicle-to-pedestrian (V2P), and vehicle-to-infrastructure (V2I) of autonomous driving, multi-channel communication is performed simultaneously, and a large amount of data needs to be processed and decisions need to be made instantly. Therefore, a communication network demands ultra-high bandwidth, ultra-low latency, and high reliability. The 5G network has a capability to deal with these scenarios.

Figure 9:
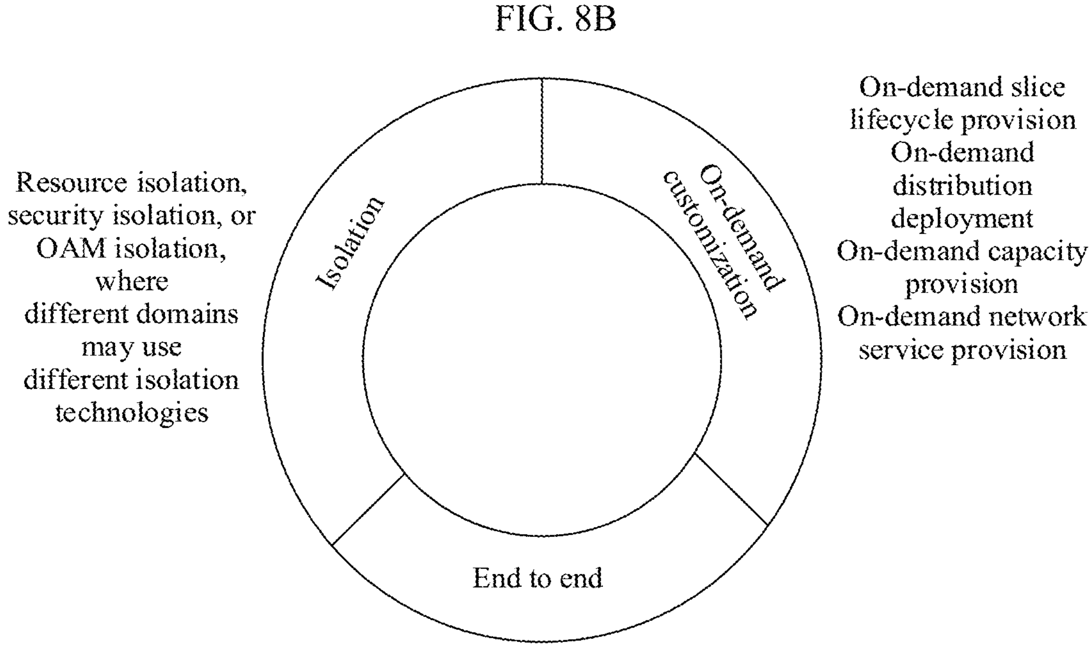
FIG. 9 is a schematic diagram of network slice features according to an embodiment of this application.
Figure 10:
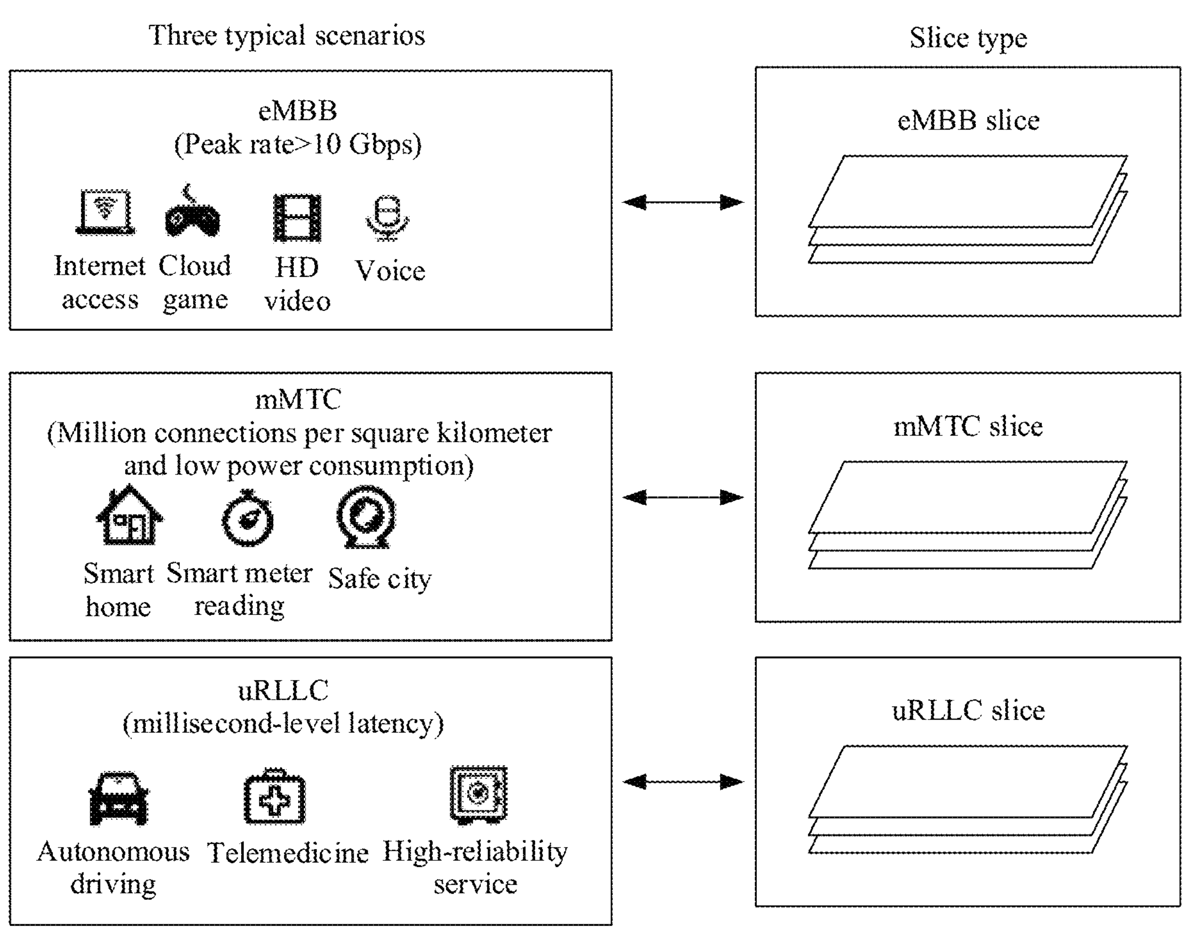
FIG. 10 is a schematic diagram of network slice types corresponding to three major application scenarios of 5G according to an embodiment of this application.

Different from the 4G era in which one network is used to meet requirements of all application scenarios and customer groups, the 5G network adds network element device-level redundancy backup to build network reliability and adds features to meet requirements continuously put forward by the mass market. In the 5G era, hundreds of billions of Internet of Things (IoT) devices access a network. Various services have different and unpredictable requirements on latency, the number of connections, reliability, and security. For example, an AR service requires ultra-high bandwidth of over 1600 Mbps of a network; an energy meter reading service requires the network to provide massive connections; and autonomous driving requires a network to ensure an end-to-end low latency of a few milliseconds and high reliability of over 99.999%. It is impossible to meet all current requirements and possible requirements in the future through one network. Therefore, a network slicing technology is introduced to 5G. As shown in FIG. 9, a network slice has three features: isolation, on-demand customization, and end-to-end. By using the network slicing technology, a plurality of independent logical networks can be virtualized on a same network infrastructure to meet different requirements. Correspondingly, as shown in FIG. 10, an eMBB slice, an mMTC slice, and a uRLLC slice that correspond to the three major scenarios of the 5G may be virtualized.

When a network slice is deployed in a core network, and a terminal device initially registers with a network, a network slice selection process is triggered. The network slice selection process depends on the subscription data of the terminal device, local configuration information, a roaming agreement, an operator policy, and the like. In the network slice selection process, the foregoing parameters need to be comprehensively considered, so as to select an optimal slice type for the terminal device.

Figures 11, 12:
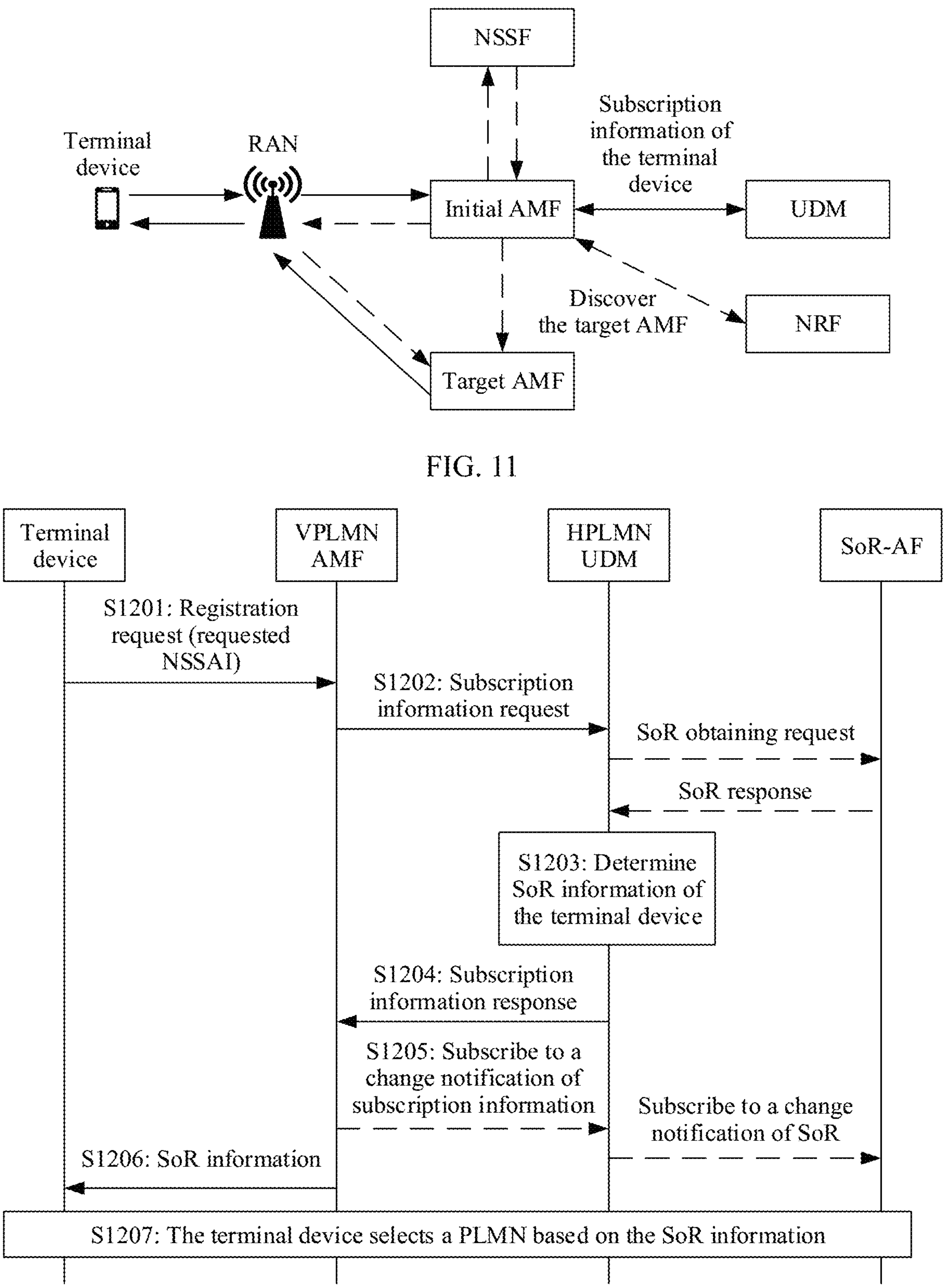
FIG. 11 is a schematic diagram of registration of a terminal device according to an embodiment of this application.
FIG. 12 is a schematic flowchart in which a home public land mobile network (HPLMN) updates steering of roaming (SoR) information during registration according to an embodiment of this application.

As shown in FIG. 11, in a registration procedure of a terminal device, a RAN first selects, based on locally stored information and a registration request message of the terminal device, an AMF (namely, an initial AMF) network element for the terminal device to provide a service for the terminal device. However, the initial AMF network element may not support a network slice to be used by the terminal device. For example, the initial AMF network element supports only a uRLLC-type network slice, but the terminal device requires an eMBB-type network slice. If the initial AMF network element cannot provide a service for the terminal device, the initial AMF network element queries an NSSF network element and selects a target AMF network element that can support the network slice of the terminal device, and then directly or indirectly sends a registration request message of the terminal device to the target AMF network element. The target AMF network element processes the registration request of the terminal device, to provide a network service for the terminal device.

According to a current standard, the terminal device selects a PLMN in the following priority order: 1. a PLMN that the terminal registers with before a previous power-off or network disconnection, or a PLMN equivalent to the PLMN (registered PLMN or equivalent RPLMN); 2. a home PLMN, or a PLMN equivalent to the PLMN (HPLMN or EPLMN); 3. a user-defined PLMN priority list (User-controlled PLMN selector); and 4. an operator-defined priority list (Operator-controlled PLMN selector). The user-defined PLMN priority list or the operator-defined priority list may include a group of PLMN lists with priorities, for selection by the terminal device. The HPLMN may update the operator-defined priority list by sending steering of roaming (SoR) information to the terminal device, so as to control PLMN selection of the terminal device.

FIG. 12 shows a process in which an HPLMN updates the SoR information during registration. The process includes the following steps.

S1201: A terminal device sends a registration request to an AMF network element, where the registration request carries network slice selection assistance information (NSSAI) requested by the terminal device.

S1202: After receiving the registration request, the AMF network element sends a subscription information request to a UDM network element.

The subscription information request carries identification information of the terminal device. For example, the subscription information request carries a subscription permanent identifier of the terminal device, namely, a globally unique subscriber identifier (SUPI) in a 5G system.

S1203: The UDM network element determines the SoR information of the terminal device.

Because the terminal device initially registers with a VPLMN, if subscription information of a user indicates that the SoR information needs to be sent when the terminal device registers with the VPLMN, when the terminal device initially registers with the VPLMN, the UDM network element needs to provide the SoR information for the terminal device.

The UDM network element may generate the SoR information based on a list of preferred PLMN/access technology combinations corresponding to the terminal device or a secured packet corresponding to the terminal device in subscription information of the terminal device. The security packet corresponding to the terminal device includes a list of preferred PLMN/access technology combinations encapsulated with a security mechanism.

When the list of preferred PLMN/access technology combinations corresponding to the terminal device and the secured packet corresponding to the terminal device are not configured in the UDM network element, the UDM network element may send an SoR obtaining request to a steer of roaming application function (SoR-AF) network element, to obtain, from the SoR-AF network element, the list of preferred PLMN/access technology combinations corresponding to the terminal device or the secured packet corresponding to the terminal device. Certainly, the SoR-AF network element may alternatively provide neither of the list of preferred PLMN/access technology combinations corresponding to the terminal device and the secured packet corresponding to the terminal device. Alternatively, the SoR obtaining request of the UDM network element may not be responded within a specified duration. In this case, the SoR information of the terminal device determined by the UDM network element may indicate that "no change of the 'Operator Controlled PLMN Selector with Access Technology' list stored in the UE is needed and thus no list of preferred PLMN/access technology combinations is provided" (in other words, no change of the operator-defined priority list stored in the terminal device is needed and thus no list of preferred PLMN/access technology combinations is provided).

S1204: The UDM network element responds to the subscription information request of the AMF network element, where the subscription information request includes the SoR information.

S1205: The AMF network element may further subscribe to a change notification of subscription information from the UDM network element. The UDM network element may further subscribe to a change notification of SoR from the SoR-AF network element.

S1206: The AMF network element sends the SoR information to the terminal device in a registration accept message.

S1207: The terminal device selects a PLMN based on the SoR information.

Figure 13:
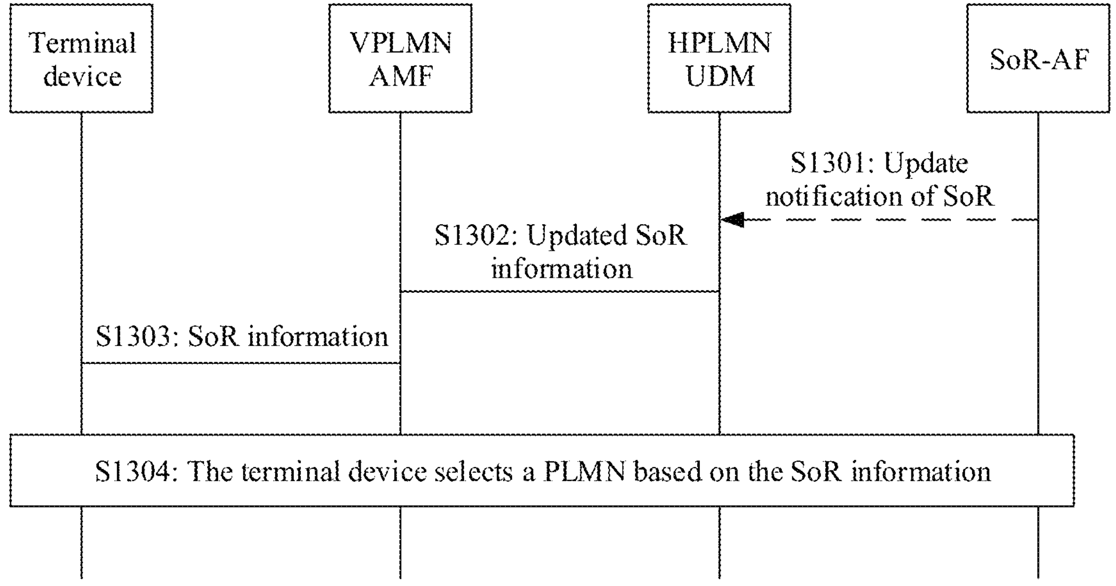
FIG. 13 is a schematic flowchart in which an HPLMN updates SoR information after registration according to an embodiment of this application.

FIG. 13 shows a process in which an HPLMN updates SoR information after registration. The process includes the following steps.

S1301: An SoR-AF network element sends an update notification of SoR to a UDM network element, to notify the UDM network element of an updated list of preferred PLMN/access technology combinations corresponding to a terminal device, an updated secured packet corresponding to the terminal device, or the like.

S1302: The UDM network element updates the SoR information and sends the SoR information to an AMF network element.

S1303: The AMF network element sends the SoR information to the terminal device.

S1304: The terminal device selects a PLMN based on the SoR information.

However, PLMNs included in current SoR information are usually all PLMNs supported by a terminal device, and priorities of the PLMNs are sorted based on a predetermined policy, which causes a problem that a PLMN selected by the terminal device does not support a network slice to be used (e.g., expected) by the terminal device. Consequently, the terminal device performs PLMN selection for a plurality of times to attempt to access a selected PLMN and access efficiency is affected. This application aims at resolving the foregoing problem.

Embodiment 1

Figure 14:
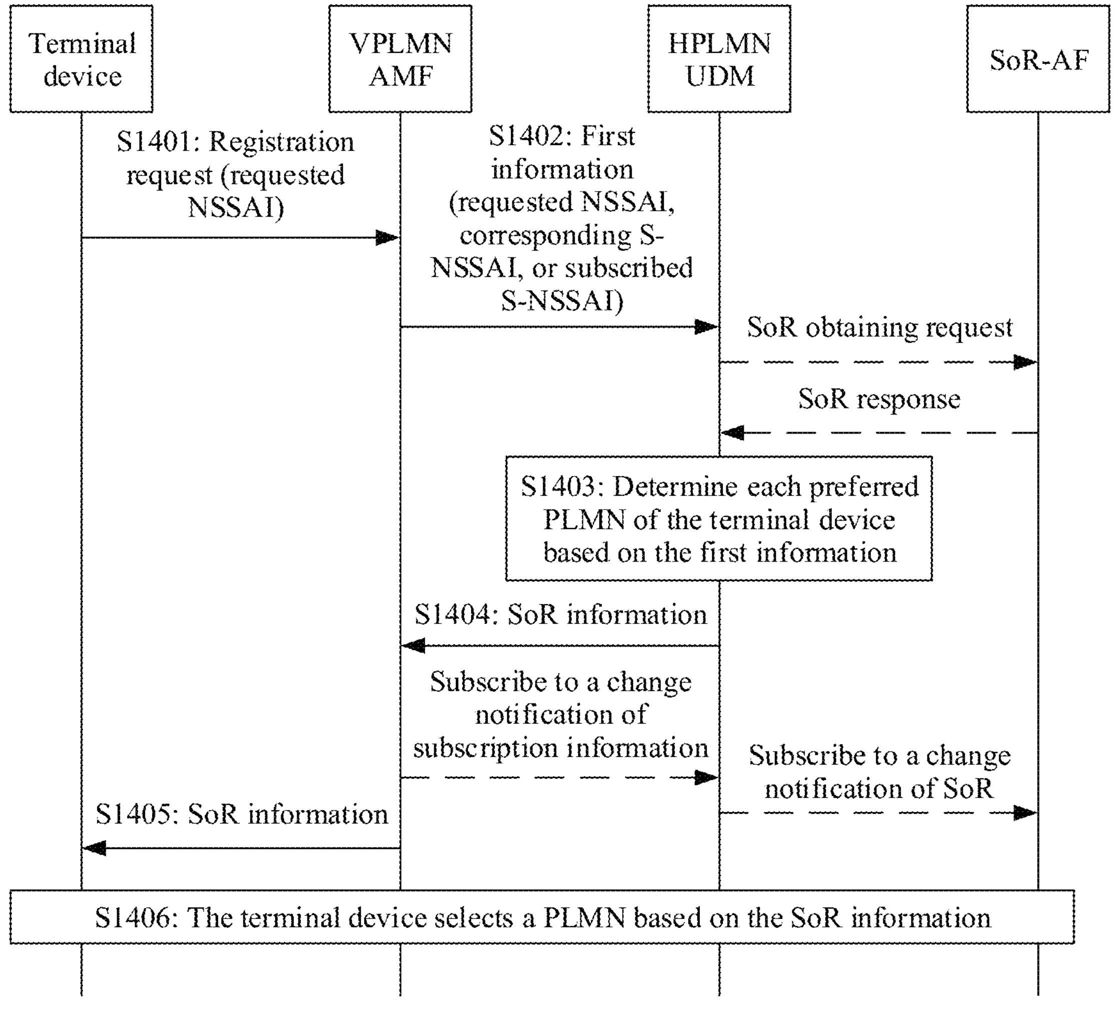
FIG. 14 is a schematic diagram of a first communication process according to an embodiment of this application.

FIG. 14 is a schematic diagram of a first communication process according to an embodiment of this application. The process includes the following steps.

S1401: A terminal device sends a registration request to an AMF network element. The AMF network element receives the registration request, where the registration request carries NSSAI (requested NSSAI) requested by the terminal device.

Embodiments of this application may be applied to updating SoR information by a terminal device in a visited (that is, in a roaming scenario) registration procedure. Therefore, the AMF network element herein may be a visited AMF network element of the terminal device, in other words, an AMF network element of a VPLMN of the terminal device.

Figure 15A:
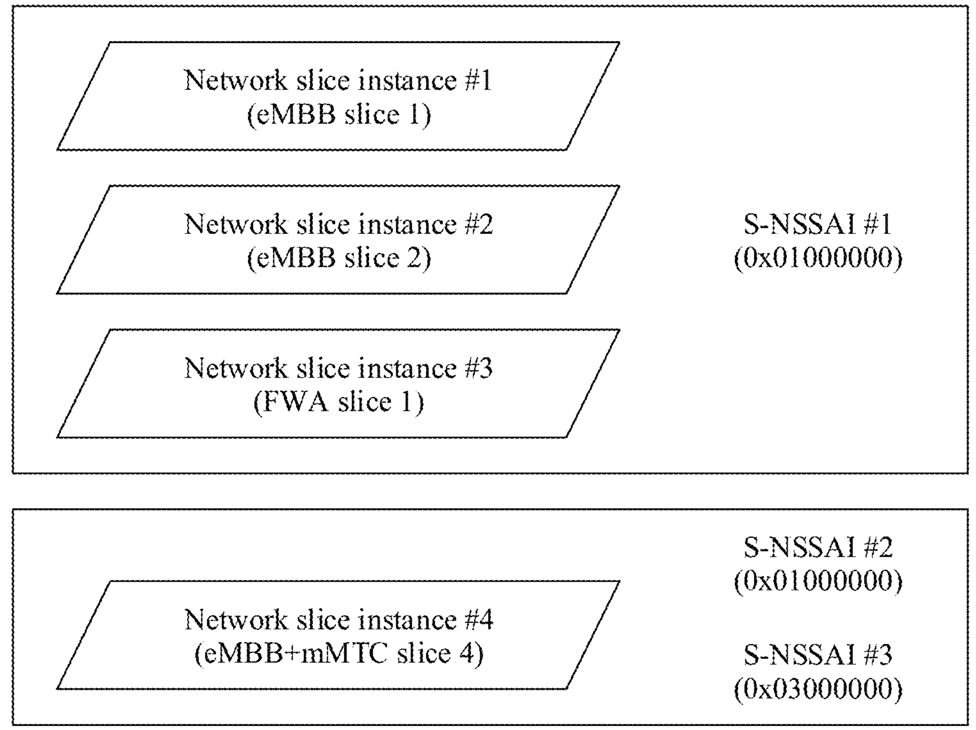
FIG. 15A and FIG. 15B are schematic diagrams of an introduction of single network slice selection assistance information (S-NSSAI) information according to embodiments of this application.

NSSAI is a set of single network slice selection assistance information (S-NSSAI). The S-NSSAI is used to identify a network slice. Based on an operation or a deployment requirement of an operator, one piece of S-NSSAI may be associated with one or more network slice instances, and one network slice instance may be associated with one or more pieces of S-NSSAI. For example, as shown in FIG. 15A, an eMBB slice 1, an eMBB slice 2, and a fixed wireless access (FWA) slice 1 are all eMBB-type slices, and S-NSSAI values of the eMBB slice 1, the eMBB slice 2, and the FWA slice 1 are all 0x01000000. An eMBB+mMTC slice 4 may provide a service for an eMBB-type service, and provide a service for an mMTC service at the same time. Therefore, the eMBB+mMTC slice 4 is both an eMBB-type slice and an mMTC-type slice, and respective corresponding S-NSSAI values are 0x01000000 and 0x03000000.

Figure 15B:
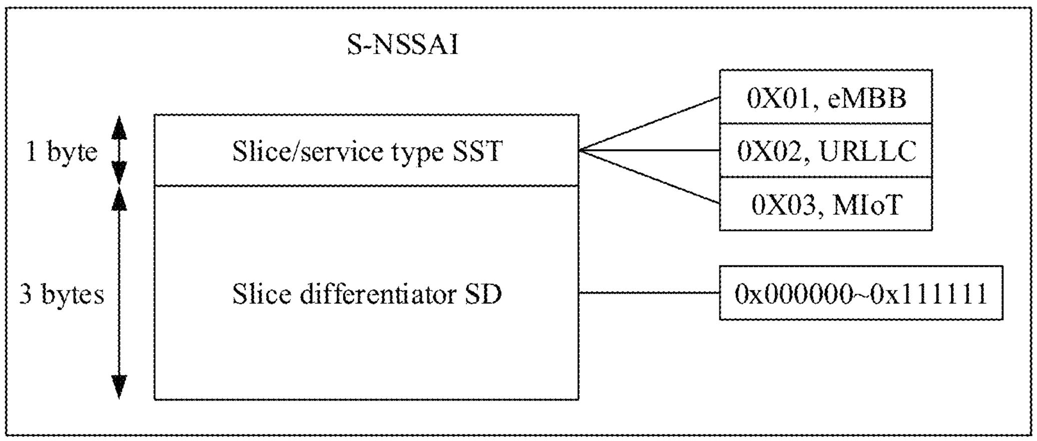

As shown in FIG. 15B, the S-NSSAI includes two parts: a slice/service type (SST) and a slice differentiator (SD). The SST refers to expected network slice behavior in terms of features and services. A standard value range of the SST is 1, 2, and 3. A value 1 indicates eMBB, a value 2 indicates uRLLC, and a value 3 indicates MIoT (mMTC). The SD is optional information used to supplement the SST to distinguish between a plurality of network slices of a same slice/service type. The SST and the SD are combined to indicate one or more slice types and the plurality of slices of the same slice type. For example, S-NSSAI values 0x01000000, 0x02000000 and 0x03000000 respectively indicate eMBB-type, uRLLC-type, and MIoT-type slices. S-NSSAI values 0x01000001 and 0x01000002 indicate eMBB-type slices that respectively serve a user group 1 and a user group 2.

NSSAI used in a communication system usually includes requested NSSAI, allowed NSSAI, or configured NSSAI, whose definitions are shown in Table 1. In embodiments of this application, during registration, the terminal device may send, to the AMF network element, a registration request carrying the requested NSSAI, so that the AMF network element learns of a network slice that the terminal device expects to use.

TABLE 1

| NSSAI | Definition |
|---|---|
| Requested NSSAI | Is NSSAI that the terminal device expects to use, and is provided by the terminal device to a network side in a registration procedure, where for example, the requested NSSAI may include a maximum of eight pieces of S-NSSAI. |
| Allowed NSSAI | Is provided by a serving PLMN for the terminal device in a procedure such as registration, and indicates an S-NSSAI value that may be used by the terminal device in a current registration area of the serving PLMN, where for example, the allowed NSSAI may include a maximum of eight pieces of S-NSSAI, and the terminal device locally stores the allowed NSSAI. |
| Configured NSSAI | Is NSSAI applicable to one or more PLMNs, and is delivered to the terminal device by the AMF network element in a message such as registration accept or a configuration update command, where for example, the configured NSSAI may include a maximum of 16 pieces of S-NSSAI, and the terminal device locally stores the configured NSSAI. |

S1402: The AMF network element sends first information to a UDM network element, and the UDM network element receives the first information.

The first information includes the NSSAI requested by the terminal device, S-NSSAI in a home domain corresponding to the NSSAI requested by the terminal device, or subscribed S-NSSAI of the terminal device.

In the conventional technology, the UDM network element does not perceive or process the NSSAI requested by the terminal device. By contrast, in embodiments of this application, after receiving the registration request sent by the terminal device, the AMF network element may send, based on the NSSAI requested by the terminal device and carried in the registration request, the first information to the UDM network element, where the first information includes the NSSAI requested by the terminal device.

Certainly, the AMF network element may alternatively map the NSSAI requested by the terminal device, to determine the S-NSSAI in the home domain corresponding to the NSSAI requested by the terminal device, or the subscribed S-NSSAI of the terminal device.

In the roaming scenario, the NSSAI requested by the terminal device corresponds to a roaming domain (in other words, S-NSSAI included in the roaming domain is S-NSSAI specific to a VPLMN). In this case, the AMF network element needs to map the S-NSSAI to S-NSSAI of a corresponding HPLMN. The AMF network element may generate, based on "the mapping to HPLMN S-NSSAIs (namely, a mapping relationship to HPLMN S-NSSAI)" provided by the terminal device, the S-NSSAI (corresponding to the S-NSSAI of the HPLMN) of the home domain corresponding to the NSSAI requested by the terminal device, and send the S-NSSAI to the UDM network element.

Alternatively, when the AMF network element determines that the terminal device that sends the registration request belongs to a roaming user (where for example, a PLMN ID of a SUPI is different from that of a serving PLMN), the AMF network element may send separate indication information to the UDM network element, to notify that the UDM network element needs to generate SoR based on the "subscribed S-NSSAI of the terminal device". For example, the AMF network element sends back the "subscribed S-NSSAI of the terminal device" received from the UDM network element to the UDM network element. Certainly, during implementation, the UDM network element may directly generate the SoR based on the "subscribed S-NSSAI of the terminal device" because the "subscribed S-NSSAI of the terminal device" is stored in the UDM network element. In other words, from the perspective of the UDM network element, the UDM network element may not receive the subscribed S-NSSAI of the terminal device from the AMF network element.

S1403: The UDM network element determines, based on the first information, each preferred PLMN of the terminal device.

In a possible implementation, the UDM network element may determine each preferred PLMN of the terminal device based on subscription information of the terminal device and the first information. For example, the UDM network element determines each preferred PLMN of the terminal device based on a list of preferred PLMN/access technology combinations corresponding to the terminal device or a secured packet corresponding to the terminal device, and the first information; and the UDM network element may generate the SoR information based on each preferred PLMN of the terminal device.

For example, network slices to which the terminal device subscribes include a network slice 1, a network slice 2, a network slice 3, a network slice 4, and a network slice 5. In the list of preferred PLMN corresponding to the terminal device, a PLMN 1 supports the network slice 1 and the network slice 2; a PLMN 2 supports the network slice 3; and a PLMN 3 supports the network slice 4 and the network slice 5. If the UDM network element may learn that the NSSAI requested by the terminal device includes only S-NSSAI corresponding to the network slice 5, the UDM network element determines that a preferred PLMN of the terminal device is the PLMN 3. Based on the case in which the preferred PLMN of the terminal device is the PLMN 3, the UDM network element generates the SoR information (where for example, a priority of the PLMN 3 is higher than that of the PLMN 2 and the PLMN 1; or the SoR information includes only the PLMN 3 and does not include the PLMN 2 and the PLMN 1). By contrast, if the conventional technology in FIG. 12 is applied, in the SoR information generated by the UDM network element, a priority of the PLMN 1 is higher than that of the PLMN 2, and the priority of the PLMN 2 is higher than that of the PLMN 3. Consequently, the terminal device cannot directly select the PLMN 3 to attempt to access, and can select the PLMN 3 to attempt to access only after selecting the PLMN 1 and the PLMN 2. This reduces access efficiency.

For another example, network slices to which the terminal device subscribes include a network slice 1, a network slice 2, a network slice 3, a network slice 4, and a network slice 5. In the list of preferred PLMN corresponding to the terminal device, a PLMN 1 supports the network slice 1, the network slice 2, and the network slice 3; and a PLMN 3 supports the network slice 4 and the network slice 5. In this case, the UDM network element determines that a priority of the preferred PLMN 3 of the terminal device is higher than that of the PLMN 1, and the UDM network element generates the SoR information on this basis. By contrast, if the conventional technology in FIG. 12 is applied, in the SoR information generated by the UDM network element, a priority of the PLMN 1 is higher than that of the PLMN 3. Consequently, the terminal device cannot directly select the PLMN 3 to attempt to access, and can select the PLMN 3 to attempt to access only after selecting the PLMN 1 to attempt to access. This reduces access efficiency.

To obtain information about a slice supported by a related PLMN, the UDM network element may locally configure the information about the slice supported by the related PLMN, or may directly obtain the information from an NSSF network element. Alternatively, the AMF network element may obtain the information from an NSSF network element and then send the information to the UDM network element.

An SoR-AF network element may locally configure the information about the slice supported by the related PLMN, or may directly obtain the information from the NSSF network element. Alternatively, the UDM network element may obtain the information and then send the information to the SoR-AF network element. If the information is configured in the SoR-AF network element or is obtained from the NSSF network element by the SoR-AF network element, the UDM network element may further obtain the information from the SoR-AF network element.

In a possible implementation, to reduce signaling overheads, each determined preferred PLMN of the terminal device is the only PLMN that is supported when the terminal device is in a registration domain. In other words, both location information of the terminal device and time information for sending the registration request are considered. This is because a same PLMN may support different slices at different locations at different time. That is, the first information may additionally include the location information of the terminal device and/or the time information of the request. For example, information shown in the following Table 2 may be configured in the UDM network element and the SoR-AF network element.

TABLE 2

| PLMN ID | Information about a supported slice | Location information (optional) | Time information (optional) |
|---|---|---|---|
| PLMN 1 | S-NSSAI-1 | Tracking area 1 and tracking area 2 | UTC 8:00-18:00 |
| | S-NSSAI-2 | Tracking area | All day |
| PLMN 2 | S-NSSAI-3 | All domains | By 18:00 on MM/DD/YYYY |

In addition, when there is not the list of preferred PLMN/access technology combinations or the secured packet configured in the UDM network element, where the list of preferred PLMN/access technology combinations or the secured packet corresponds to the terminal device, the UDM network element may send an SoR obtaining request to the SoR-AF network element. The request may include one or more information such as a VPLMN ID, identification information of the terminal device (for example, an SUPI of the terminal device), an access type, and a radio access technology type (RAT type). The SoR-AF network element may respond to an SoR obtaining request of the UDM network element, to provide the UDM network element with the list of preferred PLMN/access technology combinations corresponding to the terminal device, or the secured packet corresponding to the terminal device.

Certainly, the SoR-AF network element may alternatively provide neither of the list of preferred PLMN/access technology combinations corresponding to the terminal device and the secured packet corresponding to the terminal device; or may not respond to the SoR obtaining request of the UDM network element within a specified duration. In this case, the SoR information of the terminal device determined by the UDM network element may indicate that no change of the operator-defined priority list stored in the terminal device is needed and thus no list of preferred PLMN/access technology combinations is provided (no change of the "Operator Controlled PLMN Selector with Access Technology" list stored in the UE is needed and thus no list of preferred PLMN/access technology combinations is provided).

In another possible implementation, the UDM network element may alternatively send the first information to the SoR-AF network element when sending the SoR obtaining request to the SoR-AF network element. The SoR-AF network element determines the foregoing information based on the first information, and responds to the UDM network element with the foregoing information. For descriptions of a case in which the SoR-AF network element determines each preferred PLMN of the terminal device based on the first information, and generates SoR information, refer to the foregoing implementation of the UDM network element. Details are not described herein again.

S1404: The UDM network element sends the SoR information of the terminal device to the AMF network element, and the AMF network element receives the SoR information of the terminal device.

S1405: The AMF network element sends the SoR information to the terminal device, and the terminal device receives the SoR information.

In embodiments of this application, the AMF network element may send the SoR information of the terminal device to the terminal device in a registration accept message, or may send the SoR information of the terminal device to the terminal device in a registration reject message (where because a PLMN accessed by the terminal device may not support a network slice expected (e.g., requested) by the terminal device, registration of the terminal device is rejected).

S1406: The terminal device selects a PLMN based on the SoR information.

For example, network slices to which the terminal device subscribes include a network slice 1, a network slice 2, a network slice 3, a network slice 4, and a network slice 5. In the list of preferred PLMN corresponding to the terminal device, a PLMN 1 supports the network slice 1 and the network slice 2; a PLMN 2 supports the network slice 3; and a PLMN 3 supports the network slice 4 and the network slice 5. In this case, a network slice that the terminal device expects to access is the network slice 5, and the NSSAI requested by the terminal device includes only S-NSSAI corresponding to the network slice 5. The UDM network element determines that a preferred PLMN of the terminal device is PLMN 3, the only PLMN3 that supports the network slice 5. The terminal device may directly select the PLMN 3 to attempt to access. By contrast, if the conventional technology in FIG. 12 is applied, in the SoR information generated by the UDM network element, a priority of the PLMN 1 is higher than that of the PLMN 2, and the priority of the PLMN 2 is higher than that of the PLMN 3. Consequently, the terminal device can select the PLMN 3 to attempt to access only after selecting the PLMN 1 and the PLMN 2 to attempt to access. According to the technical solution in embodiments of this application, the terminal device is prevented from performing PLMN selection for a plurality of times to attempt to access a selected PLMN, thereby improving access efficiency.

For another example, network slices to which the terminal device subscribes include a network slice 1, a network slice 2, a network slice 3, a network slice 4, and a network slice 5. In the list of preferred PLMN corresponding to the terminal device, a PLMN 1 supports the network slice 1, the network slice 2, and the network slice 3; and a PLMN 3 supports the network slice 4 and the network slice 5. In this case, a network slice that the terminal device expects to access is the network slice 5, and NSSAI requested by the terminal device includes only S-NSSAI corresponding to the network slice 5. The UDM network element determines that a preferred PLMN of the terminal device is only the PLMN 3 that supports the network slice 5. The terminal device may directly select the PLMN 3 to attempt to access. By contrast, if the conventional technology in FIG. 12 is applied, in the SoR information generated by the UDM network element, a priority of the PLMN 1 is higher than that of the PLMN 3. The terminal device can select the PLMN 3 to attempt to access only after selecting the PLMN 1 to attempt to access. According to the technical solution in these embodiments of this application, the terminal device is prevented from performing PLMN selection for a plurality of times to attempt to access a selected PLMN, thereby improving access efficiency.

In addition, the UDM network element may further subscribe to, from the AMF network element, a notification indicating that information about a network slice requested by the terminal device changes. When the network slice (as indicated by NSSAI) requested by the terminal device changes, the AMF network element may send, to the UDM network element, a change notification of the NSSAI requested by the terminal device. After receiving the change notification of the NSSAI requested by the terminal device, the UDM network element may update the NSSAI requested by the terminal device, and a process in which an HPLMN updates the SoR information after registration of the UDM network element is triggered.

Embodiment 2

Figure 16:
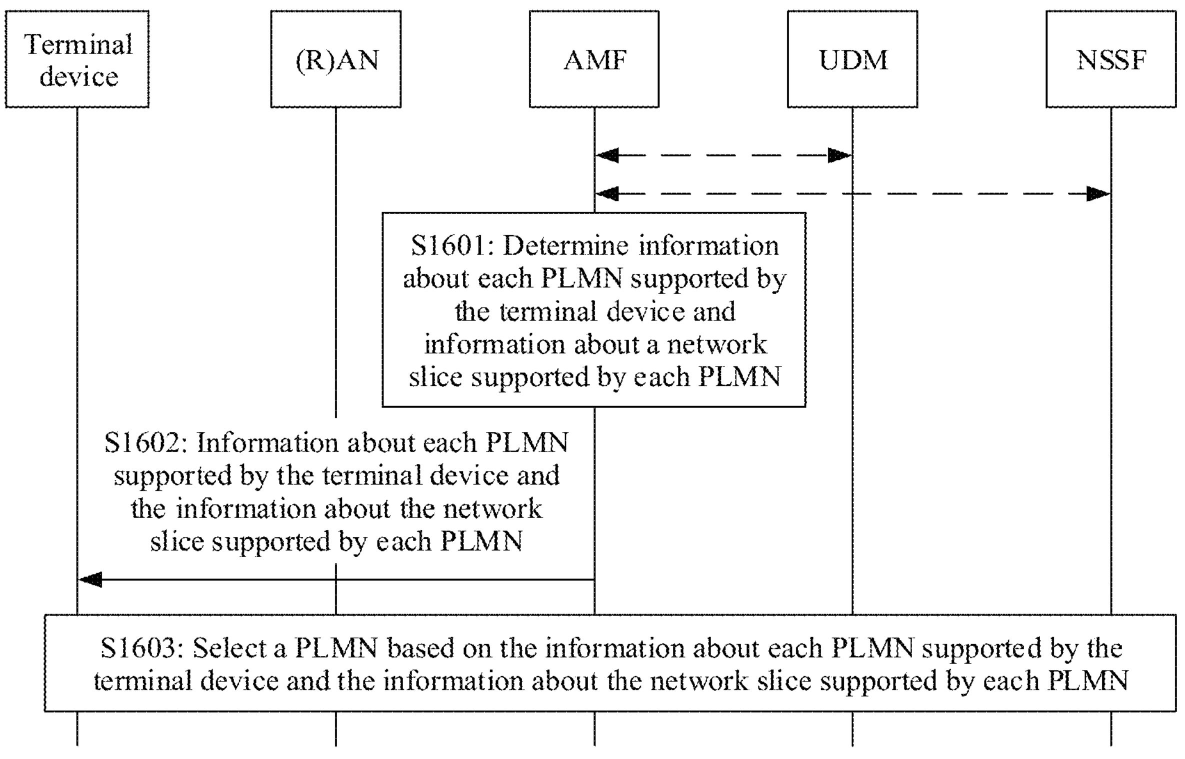
FIG. 16 is a schematic diagram of a second communication process according to an embodiment of this application.

FIG. 16 shows a second communication process according to an embodiment of this application. Embodiments of this application may be applied to a roaming or non-roaming scenario, or may be applied when an HPLMN updates SoR information during registration, or when an HPLMN updates SoR information after registration. The following describes an communication process that may include the following steps.

S1601: An AMF network element determines the information about each PLMN supported by a terminal device and the information about a network slice supported by each PLMN.

The AMF network element may determine the information about each PLMN supported by the terminal device and the information about the network slice supported by each PLMN via a UDM network element and/or an NSSF network element. It should be understood that the information about each PLMN supported by the terminal device may be information about a PLMN that has a roaming agreement with an HPLMN of the terminal device, or may be information about a preferred PLMN, for example, SoR information in the conventional technology.

Manner 1: The AMF network element obtains, from the UDM network element, the information about each PLMN supported by the terminal device, and obtains, based on the information about each PLMN supported by the terminal device and from the NSSF network element, the information about the network slice supported by each PLMN supported by the terminal device.

For example, the AMF network element may obtain, from the UDM network element, a list of preferred PLMN/access technology combinations corresponding to the terminal device or a secured packet corresponding to the terminal device (for example, SoR information of subscription information of the terminal device in the conventional technology), to obtain the information about each PLMN supported by the terminal device. For example, if the list of preferred PLMN corresponding to the terminal device records, in descending order of priorities, information about a PLMN 1, a PLMN 3, and a PLMN 4 that are supported by the terminal device, the AMF network element determines that the terminal device supports the PLMN 1, the PLMN 3, and the PLMN 4.

After obtaining the information about each PLMN supported by the terminal device, the AMF network element may send a query request to the NSSF network element. The query request may include identification information of the PLMN 1, the PLMN 3, and the PLMN 4 that are supported by the terminal device. The NSSF network element queries information about network slices respectively supported by the PLMN 1, the PLMN 3, and the PLMN 4, and returns the information to the AMF network element.

Manner 2: The AMF network element obtains, from the NSSF network element, information about a network slice supported by one or more PLMNs supporting roaming, and obtains, from the UDM network element, the information about each PLMN supported by the terminal device. Based on the information about the network slice supported by one or more PLMNs supporting roaming and the information about each PLMN supported by the terminal device, the AMF network element determines the information about the network slice supported by each PLMN supported by the terminal device.

For example, roaming-supporting PLMNs that are obtained by the AMF network element from the NSSF network element include a PLMN 1, a PLMN 2, a PLMN 3, and a PLMN 5. The PLMN 1 supports a network slice 1 and a network slice 2, the PLMN 2 supports a network slice 3, the PLMN 3 supports a network slice 4 and a network slice 5, and the PLMN 5 supports a network slice 7. It is learned from the UDM network element that the terminal device supports the PLMN 1 and the PLMN 5. The AMF network element determines that the terminal device supports the PLMN 1 and the PLMN 5, where the PLMN 1 supports the network slice 1 and the network slice 2, and the PLMN 5 supports the network slice 7.

Manner 3: The AMF network element receives the SoR information of the terminal device from the UDM network element, where the SoR information includes the information about each PLMN supported by the terminal device and the information about the network slice supported by each PLMN.

The UDM network element may further interact with an SoR-AF network element to generate the SoR information (for a related process, refer to conventional technology). The UDM network element may locally configure information about a slice supported by a related PLMN, or may directly obtain the information from the NSSF network element. Alternatively, the AMF network element may obtain the information from the NSSF network element and then send the information to the UDM network element. An SoR-AF network element may locally configure the information about the slice supported by the related PLMN, or may directly obtain the information from the NSSF network element. Alternatively, the UDM network element may obtain the information and then send the information to the SoR-AF network element. If the information is configured in the SoR-AF network element or is obtained from the NSSF network element, the UDM network element may further obtain the information from the SoR-AF network element.

In a possible implementation, to reduce signaling overheads, each PLMN that is determined and that is supported by the terminal device is the only PLMN that is supported when the terminal device is in a registration domain. In other words, both location information of the terminal device and time information for sending the request are considered. This is because a same PLMN may support different slices at different locations at different time.

Certainly, in another implementation, the delivered information may include both location and/or time information. For example, information shown in the above Table 2 may be configured in the UDM network element and the SoR-AF network element.

For example, if the terminal device supports a PLMN 1 and a PLMN 5, the PLMN 1 supports a network slice 1 and a network slice 2, and the PLMN 5 supports a network slice 7, and only the PLMN 5 belongs to a registration domain corresponding to the terminal device, each determined PLMN supported by the terminal device is only the PLMN 5.

It should be understood that when a PLMN with which the terminal device registers is a VPLMN, the AMF network element is a visited AMF network element of the terminal device.

S1602: The AMF network element sends the information about each PLMN supported by the terminal device and the information about the network slice supported by each PLMN to the terminal device.

S1603: The terminal device selects a PLMN based on the information about each PLMN supported by the terminal device and the information about the network slice supported by each PLMN.

After obtaining the information about each PLMN supported by the terminal device and the information about the network slice supported by each PLMN, the terminal device may select, based on a network slice expected by the terminal device, a corresponding PLMN to attempt to access. This can avoid a problem that the terminal device performs PLMN selection for a plurality of times to attempt to access a selected PLMN and access efficiency becomes low, and enables the terminal device to select a PLMN that can support a network slice to be used by the terminal device. In this case, the terminal device is prevented from performing PLMN selection for a plurality of times to attempt to access a selected PLMN, thereby improving access efficiency.

For example, if the terminal device supports a PLMN 1 and a PLMN 5, the PLMN 1 supports a network slice 1 and a network slice 2, and the PLMN 5 supports a network slice 7, and the terminal device expects (requests) to access the network slice 7, the terminal device may directly select the PLMN 5 to attempt to access.

Figure 17:
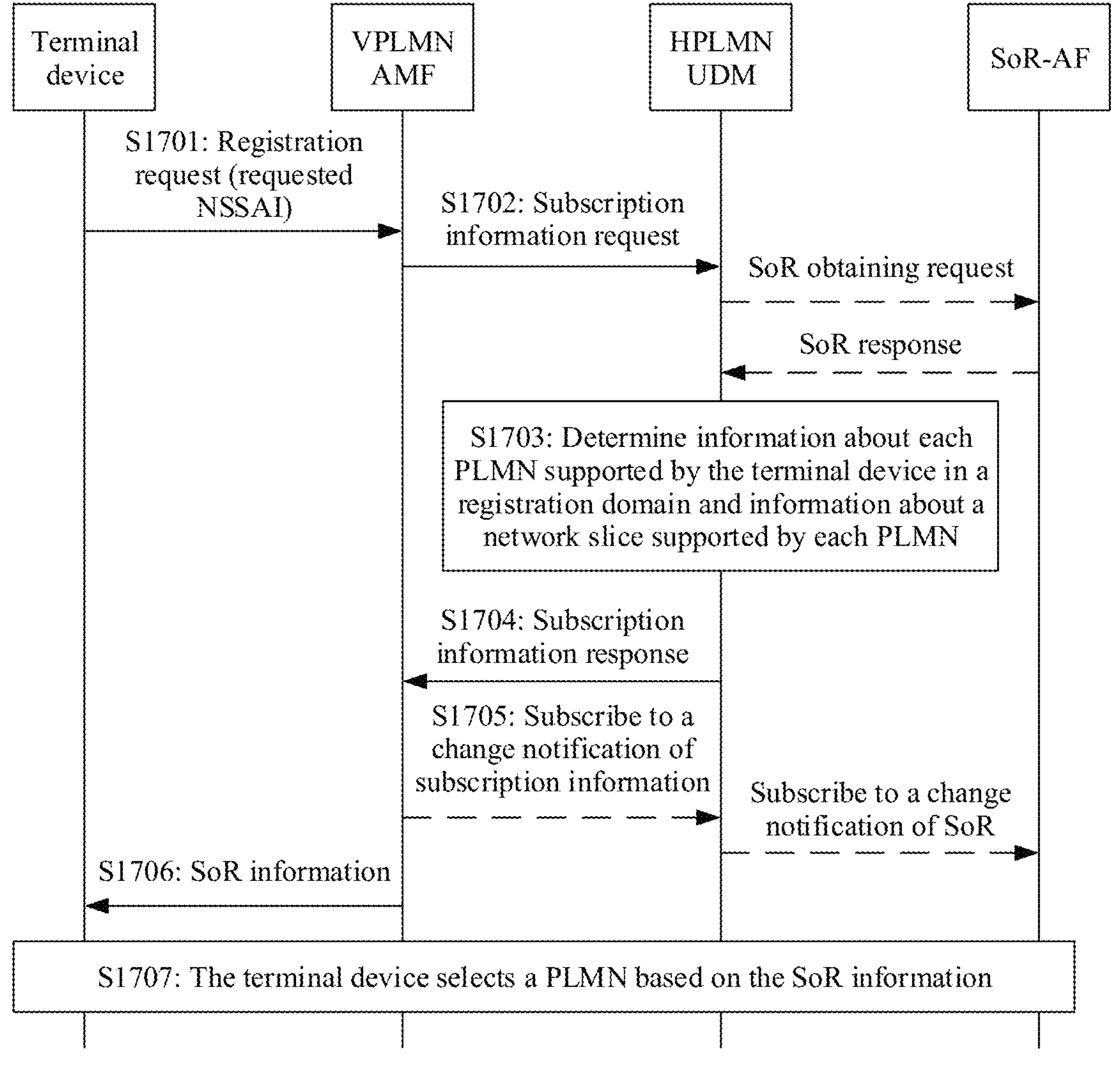
FIG. 17 is a schematic diagram of a third communication process according to an embodiment of this application.

An example of a process in which an HPLMN updates SoR information during registration of a terminal device is used. FIG. 17 is a schematic diagram of a third communication process according to an embodiment of this application.

S1701: A terminal device sends a registration request to an AMF network element, where the registration request carries NSSAI (requested NSSAI) requested by the terminal device.

S1702: After receiving the registration request, the AMF network element sends a subscription information request to a UDM network element, where the subscription information request carries identification information of the terminal device.

S1703: The UDM network element determines information about each PLMN supported by the terminal device in a registration domain and information about a network slice supported by each PLMN.

S1704: A UDM network element responds to a subscription information request of the AMF, where the subscription information request includes SoR information, and the SoR information includes the information about each PLMN supported by the terminal device in the registration domain and the information about the network slice supported by each PLMN.

S1705: The AMF network element may further subscribe to a change notification of subscription information from the UDM network element.

S1706: The AMF network element sends the SoR information to the terminal device in a registration accept message.

It should be understood that, in these embodiments, the AMF network element may send the SoR information to the terminal device in the registration accept message, or may send the SoR information to the terminal device in a registration reject message (where because a PLMN accessed by the terminal device may not support a network slice expected (requested) by the terminal device, the registration of the terminal device is rejected).

S1707: The terminal device selects a PLMN based on the SoR information.

The foregoing mainly describes the solutions provided in this application from a perspective of interaction between an AMF network element and a UDM network element. It may be understood that, to implement the foregoing functions, each network element includes a corresponding hardware structure and/or software module (or unit or circuit) for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 18:
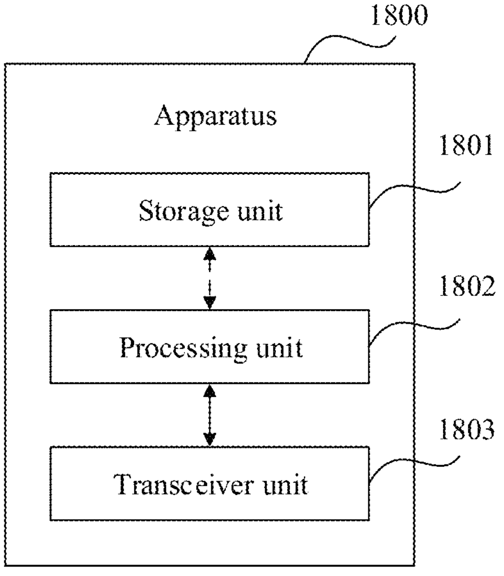
FIG. 18 is a schematic diagram of a first communication apparatus according to an embodiment of this application.

When an integrated unit (module) is used, FIG. 18 is a possible example block diagram of a communication apparatus according to an embodiment of this application. A communication apparatus 1800 may exist in a form of software. The apparatus 1800 may include a processing unit (e.g., a processing circuit) 1802 and a transceiver unit 1803 (e.g., a transceiver circuit).

In a possible design, the processing unit 1802 is configured to implement a corresponding processing function. The transceiver unit 1803 is configured to support communication between the apparatus 1800 and another network entity. Optionally, the transceiver unit 1803 may include a receiving unit (e.g., a receiving circuit) and/or a sending unit (e.g., a sending circuit), respectively configured to perform a receiving operation and a sending operation. Optionally, the apparatus 1800 may further include a storage unit 1801 (e.g., a storage circuit), configured to store program code and/or data of the apparatus 1800.

The apparatus 1800 may be an AMF network element in any one of the foregoing embodiments (where for example, the AMF network element is the AMF network element in Embodiment 1), or may be a component such as a chip disposed in the AMF network element. The processing unit 1802 may support the apparatus 1800 in performing actions of the AMF network element in the foregoing method examples. Alternatively, the processing unit 1802 mainly performs internal actions of the AMF network element in the method examples, and the transceiver unit 1803 may support communication between the apparatus 1800 and a UDM network element, a terminal device, and the like.

In an embodiment, the processing unit 1802 is configured to determine first information after receiving a registration request sent by the terminal device, where the first information includes NSSAI requested by the terminal device, S-NSSAI in a home domain corresponding to the NSSAI requested by the terminal device, or subscribed S-NSSAI of the terminal device; and the transceiver unit 1803 is configured to send the first information to the UDM network element, where the transceiver unit 1803 is further configured to receive SoR information of the terminal device from the UDM network element, where the SoR information includes information about each (e.g., one or more) PLMN of the terminal device; and the transceiver unit 1803 is further configured to send the SoR information to the terminal device.

In a possible design, the transceiver unit 1803 is further configured to: when the NSSAI requested by the terminal device changes, send a change notification of the NSSAI requested by the terminal device to the UDM network element.

In a possible design, the AMF network element is a visited AMF network element of the terminal device.

In another embodiment, the processing unit 1802 is configured to determine information about each PLMN supported by the terminal device and information about a network slice supported by each PLMN; and the transceiver unit 1803 is configured to send the information about each PLMN supported by the terminal device and the information about a network slice supported by each PLMN to the terminal device.

In a possible design, when determining the information about each PLMN supported by the terminal device and the information about the network slice supported by each PLMN, the processing unit 1802 is configured to: obtain, from the UDM network element, the information about each PLMN supported by the terminal device; and obtain, from a NSSF network element based on the information about each PLMN supported by the terminal device, the information about the network slice supported by each PLMN supported by the terminal device.

In a possible design, when determining the information about each PLMN supported by the terminal device and the information about the network slice supported by each PLMN, the processing unit 1802 is configured to: obtain, from an NSSF network element, information about a network slice supported by one or more PLMNs; obtain, from a UDM network element, the information about each PLMN supported by the terminal device, where the one or more PLMNs support roaming; and determine, based on the information about the network slice supported by the one or more PLMNs, the information about the network slice supported by each PLMN supported by the terminal device.

In a possible design, when determining the information about each PLMN supported by the terminal device and the information about the network slice supported by each PLMN, the processing unit 1802 is configured to: receive SoR information of the terminal device from a UDM network element via the transceiver unit 1803, where the SoR information includes the information about each PLMN supported by the terminal device and the information about the network slice supported by each PLMN.

In a possible design, when sending the information about each PLMN supported by the terminal device and the information about the network slice supported by each PLMN to the terminal device, the transceiver unit 1803 is configured to send the SoR information to the terminal device, where the SoR information includes the information about each PLMN supported by the terminal device and the information about the network slice supported by each PLMN.

In a possible design, each PLMN supported by the terminal device is a PLMN supported by the terminal device in a registration domain.

In a possible design, the AMF network element is a visited AMF network element of the terminal device.

Figure 19:
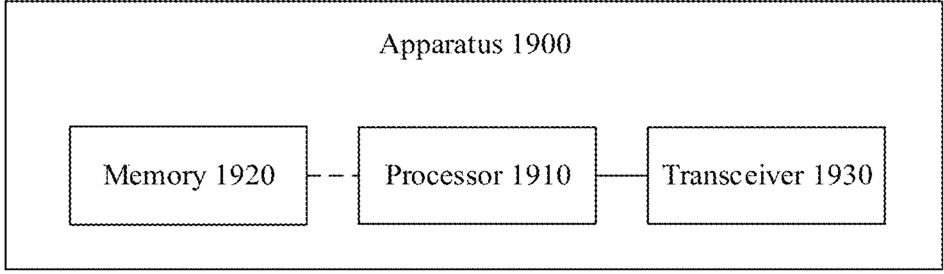
FIG. 19 is a schematic diagram of a second communication apparatus according to an embodiment of this application.

As shown in FIG. 19, an embodiment of this application further provides a communication apparatus 1900. The communication apparatus 1900 includes a processor 1910 and a transceiver 1930, and may further include a memory 1920. In a possible design, the memory 1920 stores instructions, a program, or data, and the memory 1920 may be configured to implement a function of the storage unit 1801 in the foregoing embodiment. The processor 1910 is configured to read instructions, a program, or data stored in the memory 1920. When the instructions or the program stored in the memory 1920 is executed, the processor 1910 is configured to perform operations performed by the processing unit 1802 in the foregoing embodiment, and the transceiver 1930 is configured to perform operations performed by the transceiver unit 1803 in the foregoing embodiments.

Figure 20:
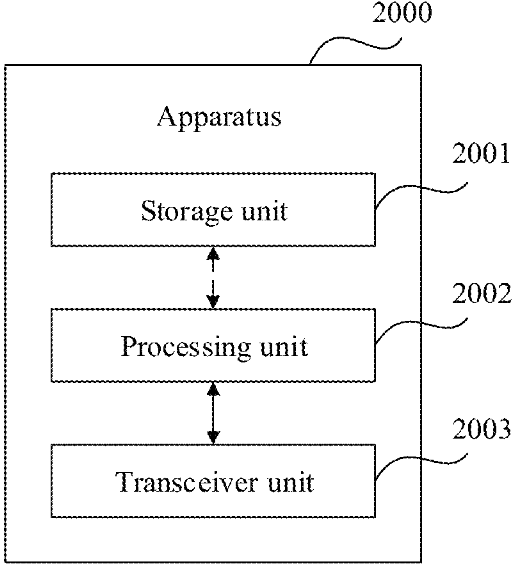
FIG. 20 is a schematic diagram of a third communication apparatus according to an embodiment of this application.

When an integrated unit (module/circuit) is used, FIG. 20 is a still another possible example block diagram of a communication apparatus according to an embodiment of this application. A communication apparatus 2000 may exist in a form of software. The apparatus 2000 may include a processing unit 2002 (e.g., a processing circuit) and a transceiver unit 2003 (e.g., a transceiver circuit). In a possible design, the processing unit 2002 is configured to implement a corresponding processing function. The transceiver unit 2003 is configured to support communication between the apparatus 2000 and another network entity. Optionally, the transceiver unit 2003 may include a receiving unit (e.g., a receiving circuit) and/or a sending unit (e.g., a sending circuit), respectively configured to perform a receiving operation and a sending operation. Optionally, the apparatus 2000 may further include a storage unit 2001 (e.g., a storage circuit), configured to store program code and/or data of the apparatus 2000.

The apparatus 2000 may be a UDM network element in any one of the foregoing embodiments (where for example, the UDM network element is the UDM network element in Embodiment 1), or may be a component such as a chip disposed in the UDM network element. The processing unit 2002 may support the apparatus 2000 in performing actions of the UDM network element in the foregoing method examples. Alternatively, the processing unit 2002 mainly performs internal actions of the UDM network element in the method examples, and the transceiver unit 2003 may support communication between the apparatus 2000 and an AMF network element, a terminal device, and the like.

In embodiments, the processing unit 2002 is configured to determine each preferred PLMN of the terminal device based on first information, where the first information includes NSSAI requested by the terminal device, S-NSSAI in a home domain corresponding to the NSSAI requested by the terminal device, or subscribed S-NSSAI of the terminal device; and the transceiver unit 2003 is configured to send SoR information of the terminal device to the AMF network element, where the SoR information includes information about each (e.g., one or more) PLMN that is supported by the terminal device.

In a possible design, the transceiver unit 2003 is further configured to receive the first information from the AMF network element.

In a possible design, the transceiver unit 2003 is further configured to receive, from the AMF network element, a change notification of the NSSAI requested by the terminal device; and the processing unit 2002 is further configured to update the NSSAI requested by the terminal device.

In a possible design, the AMF network element is a visited AMF network element of the terminal device.

In other embodiments, the processing unit 2002 is configured to determine information about each PLMN supported by the terminal device and information about a network slice supported by each PLMN; and the transceiver unit 2003 is configured to send SoR information of the terminal device to the AMF network element, where the SoR information includes the information about each PLMN supported by the terminal device and the information about the network slice supported by each PLMN.

In a possible design, each PLMN supported by the terminal device is a PLMN supported by the terminal device in a registration domain.

In a possible design, the AMF network element is a visited AMF network element of the terminal device.

Figure 21:
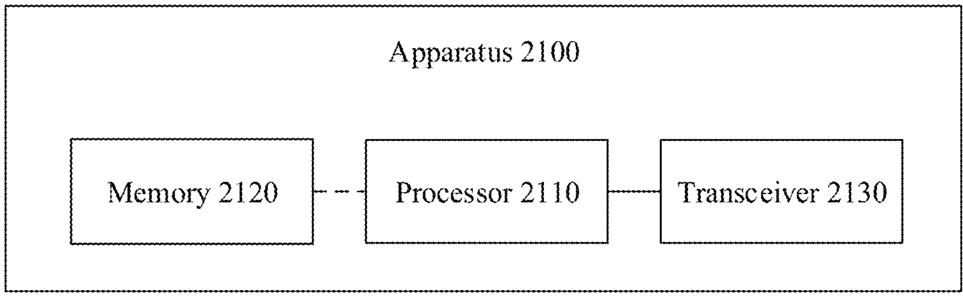
FIG. 21 is a schematic diagram of a fourth communication apparatus according to an embodiment of this application.

As shown in FIG. 21, an embodiment of this application further provides a communication apparatus 2100. The communication apparatus 2100 includes a processor 2110 and a transceiver 2130, and may further include a memory 2120. In a possible design, the memory 2120 stores instructions, a program, or data, and the memory 2120 may be configured to implement a function of the storage unit 2001 in the foregoing embodiments. The processor 2110 is configured to read instructions, a program, or data stored in the memory 2120. When the instructions or the program stored in the memory 2120 is executed, the processor 2110 is configured to perform operations performed by the processing unit 2002 in the foregoing embodiments, and the transceiver 2130 is configured to perform operations performed by the transceiver unit 2003 in the foregoing embodiments.

The foregoing processor may be a central processing unit (CPU), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or any combination thereof. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this application is intended to include but is not limited to these memories and any memory of another proper type.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the devices (and/or systems), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed on the computer or the other programmable device provide steps for implementing a specific function in one or more procedures in the flowcharts and/or in one or more blocks in the block diagrams.

Although some preferred embodiments of this application have been described, a person skilled in the art can make changes and modifications to these embodiments once the person skilled in the art learns of the basic inventive concept. Therefore, the following claims are intended to be construed as to cover the embodiments and all changes and modifications falling within the scope of this application.

Clearly, a person skilled in the art can make various modifications and variations to embodiments of this application without departing from the spirit and scope of embodiments of this application. This application is intended to cover these modifications and variations in embodiments of this application provided that they fall within the scope of protection defined by the following claims and their equivalent technologies.

What is claimed is:

1. A communication method, comprising:

after receiving a registration request from a terminal device, sending, by an access and mobility management function (AMF) network element, first information to a unified data management (UDM) network element, wherein the first information comprises network slice selection assistance information (NSSAI) requested by the terminal device, single network slice selection assistance information (S-NSSAI) in a home domain corresponding to the NSSAI requested by the terminal device, or subscribed S-NSSAI of the terminal device, wherein the first information also comprises location information of the terminal device and a time information of the registration request;

receiving, by the AMF network element, steering of roaming (SoR) information of the terminal device from the UDM network element based on the first information, wherein the SoR information comprises information about one or more preferred public land mobile network (PLMN) of the terminal device; and sending, by the AMF network element, the SoR information to the terminal device, and when the NSSAI requested by the terminal device changes, sending, by the AMF network element, a change notification of the NSSAI requested by the terminal device to the UDM network element.

2. The method according to claim 1, wherein the AMF network element is a visited AMF network element of the terminal device.

3. The method according to claim 1, wherein the method further comprises:

determining, by the UDM network element based on the first information, the one or more preferred PLMN of the terminal device; and sending, by the UDM network element, SoR information of the terminal device to the AMF network element.

4. The method according to claim 1, wherein the method further comprises:

receiving, by the UDM network element from the AMF network element, a change notification of the NSSAI requested by the terminal device; and updating, by the UDM network element, the NSSAI requested by the terminal device.

5. The method according to claim 1, further comprising mapping, by the AMF network element, the NSSAI requested by the terminal device to determine the S-NSSAI in the home domain corresponding to the NSSAI requested by the terminal device, and sending the S-NSSAI to the UDM network element.

6. The method according to claim 1, further comprising locally configuring, by the UDM network element, the information about the network slice supported by the one or more PLMN, or obtaining the information about the network slice supported by the one or more PLMN to the terminal device from a network slice selection function (NSSF) network element.

7. The method according to claim 1, wherein the one or more PLMNs supported by the terminal device comprise a PLMN preferred by the terminal device in a registration domain.

8. A communication apparatus, comprising:

a processor coupled to a memory storing instructions and configured to execute the instructions to cause the processor to:

determine first information after receiving a registration request from a terminal device, wherein the first information comprises network slice selection assistance information (NSSAI) requested by the terminal device, single network slice selection assistance information (S-NSSAI) in a home domain corresponding to the NSSAI requested by the terminal device, or subscribed S-NSSAI of the terminal device, wherein the first information also comprises location information of the terminal device and a time information of the registration request; and send the first information to a unified data management (UDM) network element, wherein via one or more transceiver circuits, the processor is configured to:

receive steering of roaming (SoR) information of the terminal device from the UDM network element based on the first information, wherein the SoR information comprises information about one or more preferred public land mobile network (PLMN) of the terminal device; and send the SoR information to the terminal device, and when the NSSAI requested by the terminal device changes, send a change notification of the NSSAI requested by the terminal device to the UDM network element.

9. The apparatus according to claim 8, wherein the processor is further configured to send information about a network slice supported by the one or more PLMN to the terminal device.

10. The apparatus according to claim 9, wherein the processor is further configured to obtain the information about the network slice supported by the one or more PLMN to the terminal device from a network slice selection function (NSSF) network element.

11. The apparatus according to claim 8, wherein, via the one or more transceiver circuits, the processor is further configured to receive SoR information of the terminal device from the UDM network element and send the SoR information to the terminal device.

12. The apparatus according to claim 8, wherein the one or more PLMN supported by the terminal device is a PLMN preferred by the terminal device in a registration domain.

13. The apparatus according to claim 8, wherein the processor is further configured to map the NSSAI requested by the terminal device to determine the S-NSSAI in the home domain corresponding to the NSSAI requested by the terminal device, and send the S-NSSAI to the UDM network element.

14. The apparatus according to claim 8, wherein the apparatus is a visited AMF network element of the terminal device.

15. A non-transitory computer-readable storage medium storing instructions that when executed by a processor cause the processor to perform a method comprising:

after receiving a registration request from a terminal device, sending first information to a unified data management (UDM) network element, wherein the first information comprises network slice selection assistance information (NSSAI) requested by the terminal device, single network slice selection assistance information (S-NSSAI) in a home domain corresponding to the NSSAI requested by the terminal device, or subscribed S-NSSAI of the terminal device, wherein the first information also comprises location information of the terminal device and a time information of the registration request;

receiving steering of roaming (SoR) information of the terminal device from the UDM network element based on the first information, wherein the SoR information comprises information about one or more preferred public land mobile network (PLMN) of the terminal device; and sending the SoR information to the terminal device, and when the NSSAI requested by the terminal device changes, sending a change notification of the NSSAI requested by the terminal device to the UDM network element.

16. The non-transitory computer-readable storage medium according to claim 15, wherein the instructions is further for sending information about a network slice supported by the one or more PLMN to the terminal device.

17. The non-transitory computer-readable storage medium according to claim 16, wherein the instructions is further for obtaining the information about the network slice supported by the one or more PLMN to the terminal device from a network slice selection function (NSSF) network element.

18. The non-transitory computer-readable storage medium according to claim 15, wherein the instructions is further for receiving SoR information of the terminal device from the UDM network element and sending the SoR information to the terminal device.

* * * * *